(12) United States Patent
Park

(10) Patent No.: US 9,458,896 B2
(45) Date of Patent: Oct. 4, 2016

(54) POWER TRANSMISSION DEVICE PROVIDED WITH MORE THAN TWO PISTONS AND METHOD OF DETERMINING RETURN SPRING FORCE IN THE SAME

(71) Applicant: C-STONE TECHNOLOGIES CO., LTD., Suwon-si (KR)

(72) Inventor: Dong-Hoon Park, Seongnam-si (KR)

(73) Assignee: C-STONE TECHNOLOGIES CO., LTD., Suwon-Si (KR)

( * ) Notice: Subject to any disclaimer, the term of this patent is extended or adjusted under 35 U.S.C. 154(b) by 3 days.

(21) Appl. No.: 14/450,460

(22) Filed: Aug. 4, 2014

(65) Prior Publication Data

US 2015/0247537 A1 Sep. 3, 2015

Related U.S. Application Data

(60) Provisional application No. 61/945,904, filed on Feb. 28, 2014.

(30) Foreign Application Priority Data

Jun. 19, 2014 (KR) ........................ 10-2014-0074902

(51) Int. Cl.
*F16D 25/12* (2006.01)
*F16D 25/0638* (2006.01)

(52) U.S. Cl.
CPC ........... *F16D 25/12* (2013.01); *F16D 25/0638* (2013.01)

(58) Field of Classification Search
CPC .. F16D 25/0635; F16D 25/083; F16D 25/12; F16D 2025/081; F16D 2048/0212; F16D 2123/00
See application file for complete search history.

(56) References Cited

U.S. PATENT DOCUMENTS

2005/0051408 A1 3/2005 Schwenger
2005/0284724 A1 12/2005 Hagenow
(Continued)

FOREIGN PATENT DOCUMENTS

DE 2033551 1/1971
DE 19742644 4/1998
(Continued)

OTHER PUBLICATIONS

International Search Report and International Written Opinion, Patent Cooperation Treaty, Aug. 19, 2015, Application No. PCT/KR2015/005922.

*Primary Examiner* — Huan Le
(74) *Attorney, Agent, or Firm* — Lex IP Meister, PLLC

(57) ABSTRACT

A method of determining a return spring load in a power transmission device including two or more pistons is disclosed. The power transmission device may include: a housing configured to form a mounting space; a clutch pack configured to include a plurality of separate plates splined to the housing, and a plurality of friction disks alternately disposed with the separate plates, the separate plates and the friction disks being selectively coupled to each other by friction; a power transmission plate configured to be splined to the friction disks; two or more pistons operatively connecting the housing to the power transmission plate by selectively applying an axial force to the clutch pack by an operating hydraulic pressure supplied to the piston chamber; and at least one return spring configured to provide a return spring load against an axial force caused by the operating hydraulic pressure.

22 Claims, 20 Drawing Sheets

(56) References Cited

U.S. PATENT DOCUMENTS

| | | | |
|---|---|---|---|
| 2008/0314711 A1* | 12/2008 | Jayaram | F16D 25/0638 192/85.34 |
| 2009/0105039 A1* | 4/2009 | Sah | B60K 6/445 477/5 |
| 2011/0220451 A1 | 9/2011 | Kuwahara | |
| 2013/0161146 A1 | 6/2013 | Hemphill | |

FOREIGN PATENT DOCUMENTS

| | | |
|---|---|---|
| DE | 69522750 | 5/2002 |
| DE | 10163438 | 7/2003 |
| DE | 102009057353 | 6/2011 |
| DE | 112012005358 | 10/2014 |
| KR | 10-0854285 | 8/2008 |

* cited by examiner

POWER TRANSMISSION DEVICE PROVIDED WITH MORE THAN TWO PISTONS AND METHOD OF DETERMINING RETURN SPRING FORCE IN THE SAME

CROSS-REFERENCE TO RELATED APPLICATION

This application claims priorities to and the benefits of U.S. Patent Provisional Application No. 61/945,904 filed in the USPTO on Feb. 28, 2014, and Korean Patent Application No. 10-2014-0074902 filed in the Korean Intellectual Property Office on Jun. 19, 2014, the entire contents of which are incorporated herein by reference.

BACKGROUND OF THE INVENTION (a) Field of the Invention

The present invention relates to a power transmission device including two or more pistons and a method of determining a return spring force in the power transmission device.

(b) Description of the Related Art

In general, a power transmission device is used to selectively transmit power of one member to another member. The power transmission device is also used to stop a rotating member.

The typical power transmission device includes a piston mounted in a housing thereof to form a piston chamber in a space between the housing and the piston, and a clutch pack configured to selectively and operatively couple the housing to a power transmission hub. The power transmission device may further include a return spring for applying an elastic force to the piston. The elastic force acts against an operating hydraulic pressure supplied to the piston chamber.

When an operating hydraulic pressure is supplied to the piston chamber, the piston is pushed in an axial direction to apply an axial force to the clutch pack. In this case, a plurality of friction disks and a plurality of separate plates included in the clutch pack are brought into contact with each other by the axial force, and are coupled to each other by frictional force. Accordingly, the power of the housing is transmitted to the power transmission hub.

When the operating hydraulic pressure supplied to the piston chamber is exhausted, the piston returns to an initial position by the action of the elastic force of the return spring. In this case, the friction disks and the separate plates included in the clutch pack are separated and disconnected from each other. Accordingly, the power of the housing is not transmitted to the power transmission hub.

Recently, research to increase the magnitude of the axial force applied to the piston while reducing the magnitude of the operating hydraulic pressure in the power transmission device has actively been in progress. Accordingly, a technique for mounting two or more pistons in one power transmission device has been undergoing development.

As the number of pistons is increased, the piston area to which the operating hydraulic pressure is applied is expanded, thereby increasing the magnitude of the axial force applied to the pistons. However, if the magnitude of the axial force applied to the pistons is increased, a return spring force that is applied against the axial force needs to be increased. Particularly, it is very important to appropriately determine the return spring force in order to properly operate the power transmission device including two or more pistons. However, the research on determination of the return spring force has not yet progressed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of appropriately determining a return spring force in a power transmission device including two or more pistons and a power transmission device to which the method can be applied.

A method of determining a return spring force in accordance with an aspect of the present invention may be applied to a power transmission device including a housing, two or more pistons mounted in the housing to selectively and operatively connect two members by an operating hydraulic pressure, and at least one return spring for providing the return spring force against an axial force caused by the operating hydraulic pressure.

In the method, a minimum value $F_{s\text{-}min}$ (Kgf) of a resultant force of the return spring force of the at least one return spring may be determined by the following formula:

$$F_{s\text{-}min} = 0.45 \text{ bar} \times A$$

where "A" indicates a total piston area (cm$^2$) of the pistons, and 1 bar is 1.033 kgf/cm$^2$.

In the method, a maximum value $F_{s\text{-}max}$ (Kgf) of the resultant force of the return spring force of the at least one return spring may be determined by the following formula:

$$F_{s\text{-}max} = A \times P - 1.2 \times (A^c \times P - 1 \text{ bar} \times A^c)$$

where "P" indicates the operating hydraulic pressure (Kgf/cm$^2$), and "$A^c$" indicates a pressure chamber area (cm$^2$) formed by the housing.

As a result, the resultant force F (Kgf) of the return spring force of the at least one return spring may be determined within a range that is calculated by the following formula:

$$0.45 \text{bar} \leq \frac{F}{A} \leq P - 1.2 \frac{A^c}{A} \times (P - 1 \text{bar}).$$

Preferably, the resultant force F of the return spring force of the at least one return spring may be determined within a range that is calculated by the following formula:

$$0.5 \leq \frac{F}{A} \leq 1.8$$

In various exemplary embodiments, the two or more pistons may be configured to be movable together in an axial direction through a securing means such as caulking, welding, press fitting, and adhering, or by operative coupling by the operating hydraulic pressure and the return spring force.

Each of the two or more pistons may include a piston chamber, and may be configured to be supplied with the same operating hydraulic pressure.

The power transmission device may be configured to supply a balance fluid against a centrifugal hydraulic pressure that acts on the piston chambers.

A power transmission device in accordance with another aspect of the present invention may include: a housing configured to form a mounting space; a clutch pack configured to include at least one separate plate splined or connected to the housing, and at least one friction disk alternately disposed with the separate plate, the separate plate and the friction disk being selectively coupled to each other by friction; a power transmission hub configured to be splined or connected to the friction disk; two or more pistons, each of which is configured to include a piston chamber, and operatively and selectively connecting the housing to the power transmission hub by an operating hydraulic pressure supplied to the piston chamber; and at least one return spring configured to provide a return spring force against an axial force caused by the operating hydraulic pressure, wherein a minimum value $F_{s\text{-}min}$ (Kgf) of the resultant force of the return spring force of the at least one return spring is determined by the following formula:

$$F_{s\text{-}min} = 0.45 \text{ bar} \times A$$

where "A" indicates a total piston area (cm$^2$) of the pistons, and 1 bar is 1.033 kgf/cm$^2$.

A maximum value $F_{s\text{-}max}$ of the resultant force of the return spring force of the at least one return spring may be determined by the following formula:

$$F_{s\text{-}max} = A \times P - 1.2 \times (A^c \times P - 1 \text{ bar} \times A^c)$$

where 1 bar is 1.033 kgf/cm$^2$.

The resultant force F (Kgf) of the return spring force of the at least one return spring may be determined within a range that is calculated by the following formula:

$$0.45 \text{ bar} \le \frac{F}{A} \le P - 1.2 \frac{A^c}{A} \times (P - 1 \text{ bar}).$$

Preferably, in the method, the resultant force F (Kgf) of the return spring force of the at least one return spring may be determined within a range that is calculated by the following formula:

$$0.5 \le \frac{F}{A} \le 1.8.$$

In various exemplary embodiments, the two or more pistons may be configured to be movable together in an axial direction through a securing means such as caulking, welding, press fitting, and adhering, or by operative coupling by the operating hydraulic pressure and the return spring force.

In various exemplary embodiments, the power transmission device may further include at least one balance wall configured to form at least one balance chamber to provide a balance fluid against a centrifugal hydraulic pressure that acts on the piston chambers.

In various exemplary embodiments, the at least one return spring may be disposed in any one of the at least one balance chamber.

In various exemplary embodiments, the at least one balance chamber may be fluidly communicated with all others.

In various exemplary embodiments, the at least one return spring may be configured to directly apply an elastic force to any one of the two or more pistons in an opposite direction of an axial force caused by an operating hydraulic pressure.

In various exemplary embodiments, the at least one return spring may be disposed between adjacent separate plates.

In various exemplary embodiments, the at least one return spring may be disposed between a separate plate at the end of one side and a separate plate at the end of the other side.

In various exemplary embodiments, the same hydraulic pressure may be applied to the two or more pistons.

In various exemplary embodiments, an operating hydraulic pressure supplied to any one of the two or more pistons may be supplied to the other pistons through operating fluid paths.

As described above, in accordance with the exemplary embodiments of the present invention, it is possible to facilitate more appropriate design of a power transmission device by providing a method of determining a range of an appropriate return spring force in the power transmission device including two or more pistons.

Accordingly, a whole length of the power transmission device can be reduced, thereby improving operability and efficiency.

DETAILED DESCRIPTION OF THE EMBODIMENTS

An exemplary embodiment of the present invention will hereinafter be described in detail with reference to the accompanying drawings.

Figure 1:
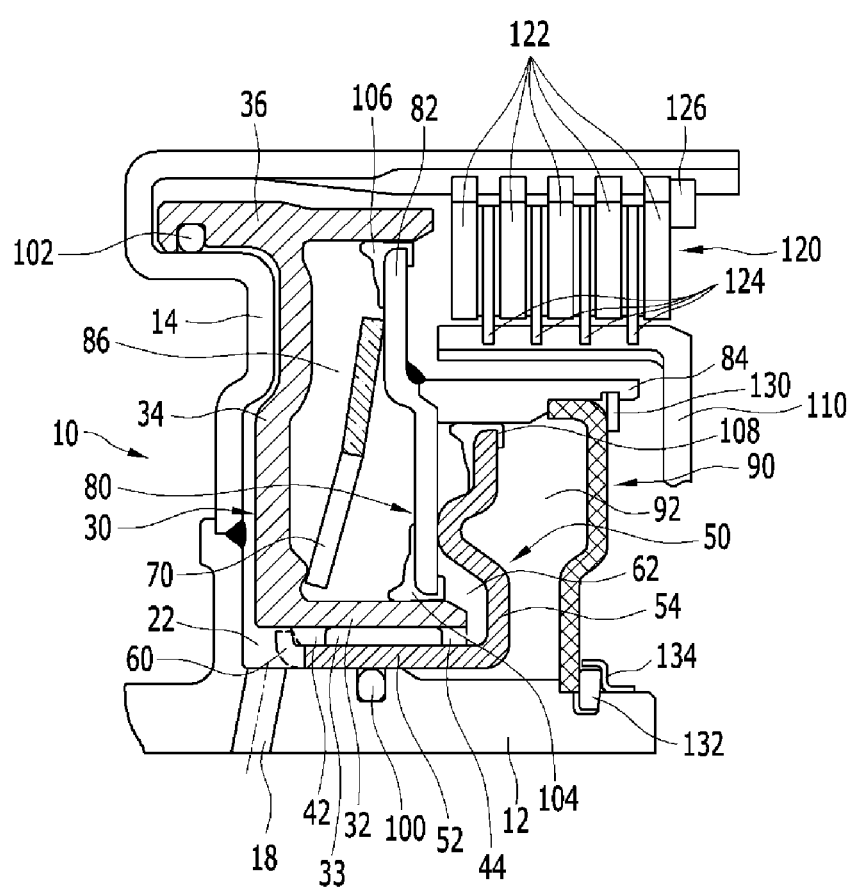
FIG. 1 is a cross-sectional view showing a power transmission device in accordance with a first exemplary embodiment of the present invention.
Figure 2:
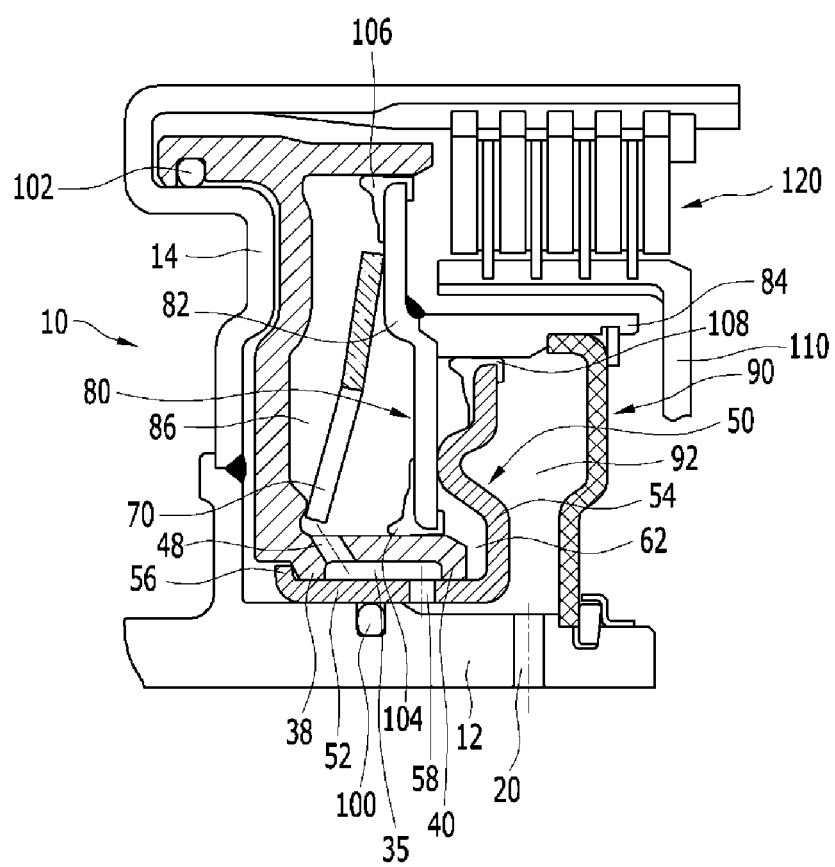
FIG. 2 is another cross-sectional view showing the power transmission device in accordance with the first exemplary embodiment.

FIG. 1 is a cross-sectional view showing a power transmission device in accordance with a first exemplary embodiment of the present invention, and FIG. 2 is another cross-sectional view showing the power transmission device in accordance with the first exemplary embodiment.

As shown in FIG. 1 and FIG. 2, the power transmission device 1 in accordance with the first exemplary embodiment of the present invention includes a housing 10, a clutch pack 120, a power transmission hub 110, a first piston 30, a second piston 50, and a return spring 70. The power transmission device 1 further includes a first balance wall 80 and a second balance wall 90. For ease of description, in this specification, a power transmission device including two pistons is mainly taken as an example, but the spirit and the scope of the present invention are not limited to the power transmission device including two pistons.

The housing 10 serves to form a mounting space, and is formed by connecting two members 12 and 14 to each other through welding, press fitting, and means such as a serration, in the first exemplary embodiment. Alternatively, the housing 10 may be formed as a single body.

The first member 12 is directly or operatively connected to an input shaft (not shown), and includes a part that is extended in an axial direction, and a part that is externally extended in a radial direction from one end of the axially extended part. An operating fluid supply hole 18 and a balance fluid supply hole 20 may be formed at the axially extended part.

In this specification and claims, when two members are described to be "operatively connected" to each other, this indicates that two members that can be rotated with respect to each other are connected to each other to be rotated.

The second member 14 includes a radially extended part that is connected to the radially externally extended part of the first member 12, and a part that is axially extended from an outer diametric end of the radially extended part. A spline or grooves may be formed on an inner circumferential surface of the axially extended part of the second member 14.

The clutch pack 120 serves to selectively connect the housing 10 to the power transmission hub 110 to selectively transmit power of the housing 10 to the power transmission hub 110. The clutch pack 120 includes at least one separate plate 122 and at least one friction disk 124.

The separate plate 122 is coupled to an inner circumferential surface of the axially extended part of the second member 14 through a means such as splines or teeth. As for one of separate plates 122 that is most remotely located from the first piston 30, axial movement of the most remote separate plate 122 is blocked by a support member 126.

The friction disk 124 and the separate plate 122 are alternately disposed. That is, one friction disk 124 is disposed between adjacent separate plates 122. Further, the friction disk 124 is splined or toothed to an outer circumferential surface of the power transmission hub 110.

When an axial force is applied to the separate plate 122, the separate plate 122 is moved in an axial direction and is frictionally coupled to the friction disk 124. Accordingly, the power of the housing 10 is transmitted to the power transmission hub 110.

It is illustrated in the present exemplary embodiment that the power of the housing 10 is transmitted to the power transmission hub 110 through the clutch pack 120, but the spirit and scope of the present invention are not limited thereto. For example, it shall be understood that any means through which the power of the housing 10 can be transmitted to the power transmission hub 110 by slightly modifying the means within such a range so as not to depart from the spirit and scope of the present invention pertains to the scope of the present invention. For example, a ball ramp, a cone clutch, a brake shoe, a dog clutch, or a synchronizer may be used as the means.

The first piston 30 is disposed in the mounting space, and a first piston chamber 22 is formed between the first piston 30 and the housing 10. The first piston chamber 22 is fluidly communicated with the operating fluid supply hole 18 to be supplied with the operating fluid. A shape of the first piston 30 is substantially similar to that of the housing 10, and includes a first piston inner diametric portion 32, a first piston body 34, and a first piston outer diametric portion 36. The first piston inner diametric portion 32, the first piston body 34, and the first piston outer diametric portion 36 may be integrally formed.

The first piston inner diametric portion 32 is axially disposed, and a plurality of first and second protrusions 38 and 40 that are radially internally protruded are formed on an inner circumferential surface of the first piston inner diametric portion 32. The first and second protrusions 38 and 40 may be separately formed in a circumferential direction, and operating fluid paths 42 and 44 are respectively formed between adjacent first protrusions 38 and between adjacent second protrusions 40. Further, a balance fluid path 48 is formed at the first piston inner diametric portion 32 between the first protrusions 38 and the second protrusions 40.

The first piston body 34 is radially externally formed at one end of the first piston inner diametric portion 32. Operating hydraulic pressure supplied to the first piston chamber 22 mostly acts on the first piston body 34.

The first piston outer diametric portion 36 is connected to an outer diametric end of the first piston body 34, and is axially extended to the vicinity of the clutch pack 120. A sealing member 102 is interposed between the first piston outer diametric portion 36 and the housing 10 to maintain air tightness of the first piston chamber 22.

The first balance wall 80 is mounted between the first piston inner diametric portion 32 and the first piston outer diametric portion 36 to form a first balance chamber 86 between the first balance wall 80 and the first piston 30. The first balance wall 80 includes a first balance body 82 and a first balance extension 84.

The first balance body 82 is radially formed between the first piston inner diametric portion 32 and the first piston outer diametric portion 36, and the first balance extension 84 is axially formed at a middle portion of the first balance body 82 away from the first piston body 34. The first balance extension 84 is nested at a radial inner side of the clutch pack 120.

A sealing member 104 and a sealing member 106 are respectively interposed between an inner diametric end of the first balance body 82 and the first piston inner diametric portion 32, and between an outer diametric end of the first balance body 82 and the first piston outer diametric portion 36, to maintain air tightness of the first balance chamber 86.

The second piston 50 is mounted on the first member 12 of the housing 10 to form a second piston chamber 62 between the second piston 50 and the first balance wall 80. The second piston 50 includes a second piston inner diametric portion 52 and a second piston body 54.

The second piston inner diametric portion 52 is disposed between the first member 12 and the first piston inner diametric portion 32, and is axially formed. The second piston inner diametric portion 52 is brought into contact with the first member 12, and is separated from the first piston inner diametric portion 32 by the first and second protrusions 38 and 40. Accordingly, a space 33 through which a fluid can flow is formed between the first piston inner diametric portion 32 and the second piston inner diametric portion 52. In addition, a plurality of bending portions 56 that are radially externally bent to be caught by the first protrusion 38 are formed at one end of the second piston inner diametric portion 52. The bending portions 56 are separately circumferentially formed, and an operating fluid path 60 is formed between adjacent bending portions 56. Further, a balance fluid path 58 which is communicated with the balance fluid path 48 may be formed at the second piston inner diametric portion 52.

At a circumferentially specific position (see FIG. 1), the first and second protrusions 38 and 40 are not formed at the first piston inner diametric portion 32 and the bending portions 56 are not formed at the second piston inner diametric portion 52 but the operating fluid paths 60, 42, 33, and 44 are formed. As a result, the first piston chamber 22 and the second piston chamber 62 are communicated with each other through the operating fluid paths 60, 42, 33, and 44. At another circumferentially specific position (see FIG. 2), the first and second protrusions 38 and 40 are formed at the first piston inner diametric portion 32, and the bending portions 56 are formed at the second piston inner diametric portion 52. Another space 35 is formed between the first and second protrusions 38 and 40. Further, the balance fluid paths 48 and 58 are respectively formed at the first piston inner diametric portion 32 and the second piston inner diametric portion 52, and the balance fluid paths 48 and 58 are communicated with each other through the space 35. As a result, the operating fluid paths 60, 42, 33, and 44 and the balance fluid paths 58, 35, and 48 are alternately formed in the circumferential direction. Further, the operating fluid paths 60, 42, 33, and 44 and the balance fluid paths 58, 35, and 48 are configured not to be communicated with each other by partitions (not shown) or the like.

A sealing member 100 is interposed between the first member 12 and the second piston inner diametric portion 52 to maintain air tightness of the first piston chamber 22.

The second piston body 54 is radially externally formed from the other end of the second piston inner diametric portion 52 to the first balance extension 84. A sealing member 108 is interposed between the first balance extension 84 and an outer diametric end of the second piston body 54 to maintain air tightness of the second piston chamber 62.

The second balance wall 90 is disposed at an axially opposite side to the first balance wall 80 with reference to the second piston body 54. The second balance wall 90 is mounted between the first member 12 and the first balance extension 84, and a second balance chamber 92 which is communicated with the balance fluid supply hole 20 is formed between the second balance wall 90 and the second piston 50. The second balance chamber 92 is also communicated with the first balance chamber 86 through the balance fluid paths 58, 35, and 48. An axial movement of an inner diametric end of the second balance wall 90 is blocked by a step portion formed in the first member 12 and a support member 132 mounted in the first member 12. Further, an escape-preventing ring 134 which covers an outer circumferential surface of the support member 132 is disposed on the first member 12 to prevent the support member 132 from escaping from the first member 12. An axial movement of an outer diametric end of the second balance wall 90 is blocked by a step portion formed in the first balance extension 84 and a support member 130 mounted in the first balance extension 84.

The outer diametric end of the second balance wall 90 is pressed and fitted into the first balance extension 84, thereby maintaining air tightness of the second balance chamber 92. Alternatively, a sealing member may be interposed between the first balance extension 84 and the second balance wall 90.

The return spring 70 is mounted in the first balance chamber 86. The return spring 70 has one end and the other end that are respectively supported by the first piston 30 and the first balance wall 80 so as to apply an elastic force against an axial force caused by the operating hydraulic pressure supplied to the first piston chamber 22 and the second piston chamber 62, to the first piston 30.

In FIG. 1 and FIG. 2, a disk spring is illustrated as an example of the return spring 70, but the present invention is not limited thereto. For example, any means capable of providing an elastic force, such as a coil spring, a wave spring, and a rubber spring may be employed as the return spring 70.

In the first exemplary embodiment shown in FIG. 1 and FIG. 2, the first and second pistons 30 and 50, the first and second balance walls 80 and 90, and the return spring 70 may be pre-assembled as one module, and may be mounted in the housing 10. In this case, it is possible to shorten an assembling time of the power transmission device 1.

Hereinafter, an operation of the power transmission device 1 will be described in accordance with the first exemplary embodiment of the present invention.

In an initial state, the power transmission hub 110 is not operatively connected to the housing 10 of the power transmission device 1. In the initial state, once an operating hydraulic pressure is supplied to the first piston chamber 22 through the operating fluid supply hole 18, the operating hydraulic pressure is also supplied to the second piston chamber 62 through the operating fluid paths 60, 42, 33, and 44. The operating hydraulic pressure supplied to the first and second piston chambers 22 and 62 respectively push the first piston 30 and the second piston 50 in a rightward direction of the drawing. Further, since the first piston 30 and the second piston 50 are configured to be axially movable together through the bending portions 56 and the first protrusion 38, axial forces of the first piston 30 and the second piston 50 are combined. Resultantly, the other end of the first piston outer diametric portion 36 pushes the separate plates 122 in the rightward direction of the drawing, and the separate plates 122 and the friction disks 124 are friction-engaged with each other. Accordingly, power of the housing 10 is transmitted to the power transmission hub 110.

In an operating state, once the operating hydraulic pressure supplied to the first and second piston chambers 22 and 62 is exhausted, the return spring 70 pushes the first piston 30 in a leftward direction of the drawing. In this case, since the first piston 30 and the second piston 50 are configured to be axially movable together through the bending portions 56 and the first protrusion 38, the first piston 30 and the second piston 50 move together in the leftward direction of the drawing, and thus the power transmission device 1 disconnects the housing 10 and the power transmission hub 110 from each other.

Meanwhile, even when the operating hydraulic pressure is exhausted, the power transmission device 1 may not completely be disengaged. In other words, the operating fluid which is not completely exhausted from the first and second piston chambers 22 and 62 may cause a centrifugal hydraulic pressure to act on the first and second pistons 30 and 50 by the action of a centrifugal force. For this case, a balance fluid is supplied to the second balance chamber 92 through the balance fluid supply hole 20. The balance fluid supplied to the second balance chamber 92 is also supplied to the first balance chamber 86 through the balance fluid paths 58, 35, and 48. The balance fluid supplied to the first and second balance chambers 86 and 92 also creates centrifugal hydraulic pressure and pushes the first and second pistons 30 and 50 in the leftward direction of drawing against the centrifugal hydraulic pressure in the piston chambers 22 and 62. Accordingly, the power transmission device 1 is completely disengaged so as to prevent piston malfunction caused by the centrifugal hydraulic pressure even at any rotational speed, thereby improving smooth operability and controllability of the power transmission device.

As described above, in the power transmission device including two or more pistons, the axial force applied to the clutch pack is increased under the same operating hydraulic pressure by the increased number of the pistons. Further, since the axial force applied to the clutch pack is increased, it is necessary to increase the return spring force that is applied against the axial force.

It is very important to appropriately determine the return spring force in order to properly operate the power transmission device including two or more pistons. In FIG. 1 and FIG. 2, it is illustrated that one return spring is used for providing an appropriate return spring force, but the present invention is not limited thereto. In other words, one or more return springs may be used in the power transmission device to provide a requested range of the return spring force and/or an installation space for the return spring. In this case, the return spring force indicates a resultant force of return spring forces used for enabling two or more pistons to return to a target position (i.e., the return spring force (vector sum) that is actually applied to two or more pistons).

Hereinafter, a method of determining a return spring force will be described in detail in accordance with an exemplary embodiment of the present invention.

First, an operating force (axial force) of the power transmission device 1 including two or more pistons is determined as follows. For ease of description, in this specification, a power transmission device including two pistons (see FIG. 1 to FIG. 4) is mainly taken as an example, but it should be understood that the spirit and the scope of the present invention are not limited to the power transmission device including two pistons.

$$F = A \times P - F_s \quad \text{[Formula 1]}$$

$$A = A_1 + A_2 \quad \text{[Formula 2]}$$

Here, "F" indicates the operating force (Kgf) of the power transmission device, "A" indicates a total piston area (cm$^2$) of the power transmission device, "P" indicates the operating hydraulic pressure (Kgf/cm$^2$), "$F_s$" indicates the return spring force (Kgf), "$A_1$" indicates an area (cm$^2$) of the first piston and is calculated by the formula $$A_1 = \frac{\pi}{4}(D_{op1}^2 - D_{ip1}^2),$$

and "$A_2$" indicates an area (cm$^2$) of the second piston and is calculated by the formula $$A_2 = \frac{\pi}{4}(D_{op2}^2 - D_{ip2}^2)$$

Figure 3:
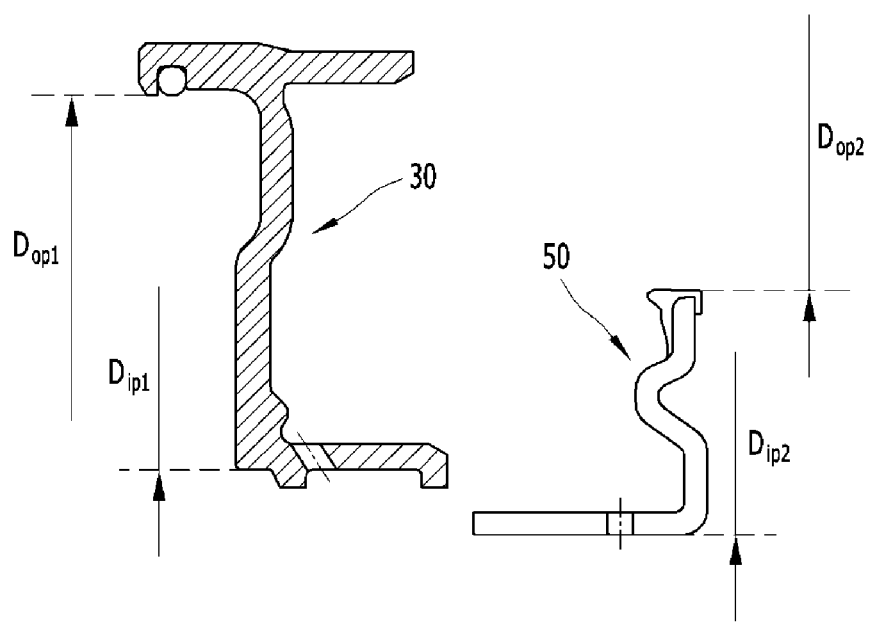
FIG. 3 and FIG. 4 show dimensions that are necessary for determining a minimum and maximum return spring force in the power transmission device in accordance with the present exemplary embodiment.

(see FIG. 3).

Hereinafter, a preferable method for selecting an appropriate range of the return spring force represented by Fs in Formula 1 will be described.

In the power transmission device 1, the operating hydraulic pressure will drop to "0" after a little time elapses from a time point at which the apply of the operating hydraulic pressure is released, in order to stop power transmission. A time at which the operating hydraulic pressure in the piston chamber drops to "0" is varied according to, e.g., a centrifugal hydraulic pressure of the piston chamber, a seal resistance, a hydraulic path resistance, a viscosity of the operating fluid, and a control method of a pressure control valve, which are known as main factors effecting a release time of the power transmission device.

When the power transmission device 1 transmits no power, the two pistons are needed to return to an initial position, i.e., an installation position, and to stay there. However, in some cases, the two pistons may be positioned where they can push the clutch pack or may move to such position due to the aforementioned factors and/or other reasons.

To prevent this problem, it is necessary to use the return spring to push the two pistons to the installation position. For this purpose, it is preferable to set the return spring force to be at least equal to or greater than 1 bar (almost atmospheric pressure, 1 bar=1.033 Kgf/cm$^2$) at an operating position at which the two pistons come into contact with the clutch pack. This indicates that it is preferable that the return spring pushes the two pistons from the operating position to the initial position with a pressure of at least 1 bar or more.

This is mathematically represented as Formula 3.

$$\frac{F_{so}}{A} \geq 1 \text{ bar} \quad \text{[Formula 3]}$$

Here, "$F_{so}$" indicates the return spring force (Kgf) at the operating position of the two pistons.

When the return spring force is determined at the operating position of the two pistons by Formula 3, the return spring force at the installation position is smaller than a value calculated by Formula 3. This is because the distance from a free height of the return spring to the installation height is smaller than the distance from the free height to the operation height.

As one nonrestrictive example, in a power transmission device of an automatic transmission, a piston travel, i.e., a distance from an installation position to an operating position approximately ranges from 0.4 mm to 7.0 mm. Further, an available spring constant "k" (Kgf/mm) is restrictive in a current spring design technology. Accordingly, it is preferable to set a return spring force at the installation position to be 60 to 80% of the return spring force at the operating position. This range of the return spring force is suitable for controllability of the power transmission device including two pistons.

Accordingly, Formula 3 may be represented as the following formula.

$$\frac{F_{si}}{A} \geq 0.6 \sim 0.8 \text{ bar} \quad \text{[Formula 4]}$$

Here, "$F_{si}$" indicates the return spring force (Kgf) at the installation position of two pistons.

A force tolerance of a current spring may be increased to ±25% according to kinds and usages (e.g., in the case that disk springs having force tolerances of ±15% are stacked in series), and thus it is preferable to define a minimum force of the return spring having the greatest spring force tolerance as follows.

$$\frac{F_{si-min}}{A} \geq 0.45 \text{ bar} \quad \text{[Formula 5]}$$

Here, "$F_{si-min}$" indicates the minimum return spring force (Kgf) at the installation position of two pistons.

Further, since the return spring force at the installation position is always smaller than that at the operating position, Formula 5 may be represented as the following formula.

$$F_{s-min} = 0.45 \text{ bar} \times A \quad \text{[Formula 6]}$$

Here, "Fs-min" indicates the allowable minimum return spring force (Kgf).

Accordingly, the spring force calculated by Formula 6 may be selected as the minimum allowable return spring force of the power transmission device including two pistons.

Figure 4:
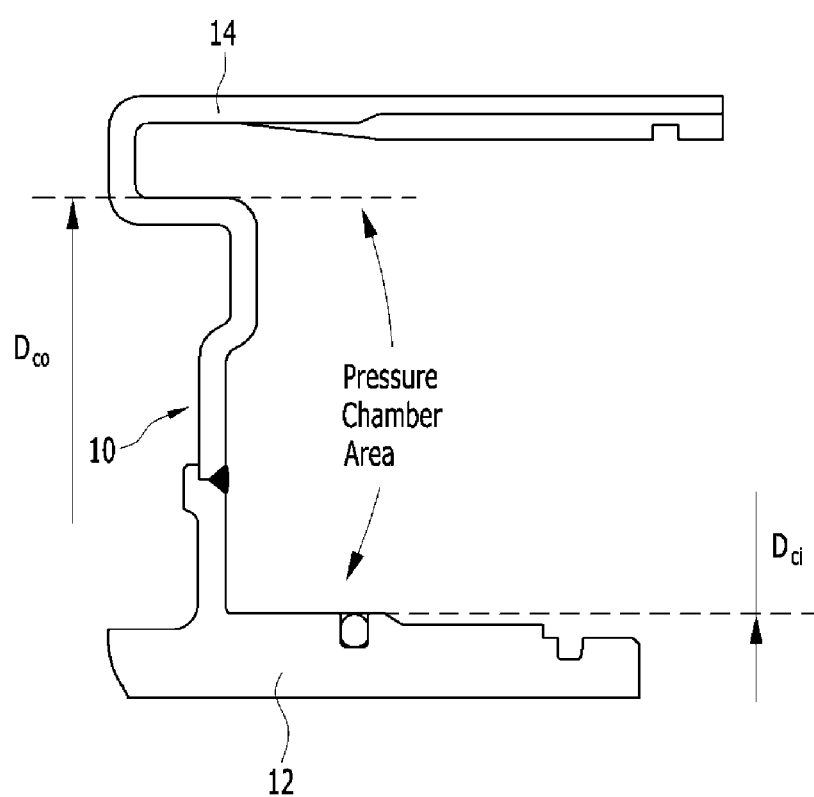

In the power transmission device including two pistons, a total piston area is designed to be larger than the area ($A^c$)

of a pressure chamber defined by a housing, a piston, a balance wall, a retainer, and the like (see FIG. 4). For any power transmission device including two pistons, it is preferable that an operating force of pistons increased by a piston area that is increased to obtain appropriate gain from two pistons is larger by at least 20% as compared with a load according to an operating hydraulic pressure which acts on the area ($A^c$) of the pressure chamber. This is mathematically represented as the following formula.

$$\frac{F}{F^c} = \frac{A \times P - F_s}{A^c \times P - F_s^c} \cong 1.2 \qquad \text{[Formula 7]}$$

Here, "$F^c$" indicates a load (Kgf) according to an operating hydraulic pressure acting on the area ($A^c$) of the pressure chamber, "$A^c$" indicates the area (cm$^2$) of the pressure chamber and is calculated by $$A^c = \frac{\pi}{4}(D_{co}^2 - D_{ci}^2),$$

and "$f_s^c$" indicates a virtual value of the return spring force (kgf) based on the area of the pressure chamber.

As shown in Formula 7, when the return spring force ($F_s$) is greater than a specific value, the operating force (F) cannot be greater than 20% or more even if the total piston area is increased by 20% or more. Accordingly, the return spring force at the operating position is required to satisfy the following condition to accomplish an increasing effect of at least 20% or more in a piston operating force.

$$F_{so-max} \leq A \times P - 1.2 \times (A^c \times P - F_s^c) \qquad \text{[Formula 8]}$$

Here, "$F_{so-max}$" indicates the maximum return spring force (Kgf) at the operating position of two pistons.

Even though $F_s^c$ is a virtual value, the value may be identically defined by Formula 3.

$$\frac{F_s^c}{A^c} \geq 1 \text{ bar} \qquad \text{[Formula 9]}$$

Since the return spring force at the operating position of two pistons is always greater than that at the installation position, Formula 9 is represented as the following formula.

$$F_{s-max} = A \times P - 1.2 \times (A^c \times P - 1 \text{ bar} \times A^c) \qquad \text{[Formula 10]}$$

Here, "$F_{s-max}$" indicates the allowable maximum return spring force (Kgf).

Accordingly, the return spring force determined by Formula 10 may be selected as the maximum return spring force for the power transmission device including two pistons.

The two formulas may be represented as one formula as follows.

$$0.45 \text{ bar} \leq \frac{F}{A} \leq P - 1.2\frac{A^c}{A} \times (P - 1 \text{ bar}) \qquad \text{[Formula 11]}$$

That is, a resultant return spring force (F) (kgf) may be set within such a range so as to satisfy Formula 11.

Further, when the engagement and disengagement of the power transmission device is controlled by using a feedback control method or an adaptive control method, it may be more effective to set the return spring force (F) (Kgf) within such a range to satisfy the following formula in consideration of a piston seal resistance, a minimum controllable pressure, a linear control range of a solenoid valve, and the like.

$$0.5 \leq \frac{F}{A} \leq 1.8. \qquad \text{[Formula 12]}$$

Here, "A" indicates a total piston area (cm$^2$).

When the return spring force is determined within the range of Formula 12, it is possible to further improve controllability of the power transmission device and operability of the pistons.

The units used in the above descriptions and formulas are merely examples for ease of the description. It shall be obvious that the basic spirit and scope of the present invention is identically explainable using other unit system, such as the SI unit system.

The same principle and method suggested in this specification may be applied to a power transmission device including two or more pistons to determine an appropriate range of the return spring force.

FIG. 5 to FIG. 10 are cross-sectional views showing a power transmission device including a balance chamber in accordance with various exemplary embodiments of the present invention.

The aforementioned method of determining the return spring force may be applied to the power transmission device shown in FIG. 5 to FIG. 10. Further, since the power transmission device shown in FIG. 5 to FIG. 10 is substantially the same as that of the power transmission device shown in FIG. 1 and FIG. 2, the differences therebetween will be mainly described.

Figure 5:
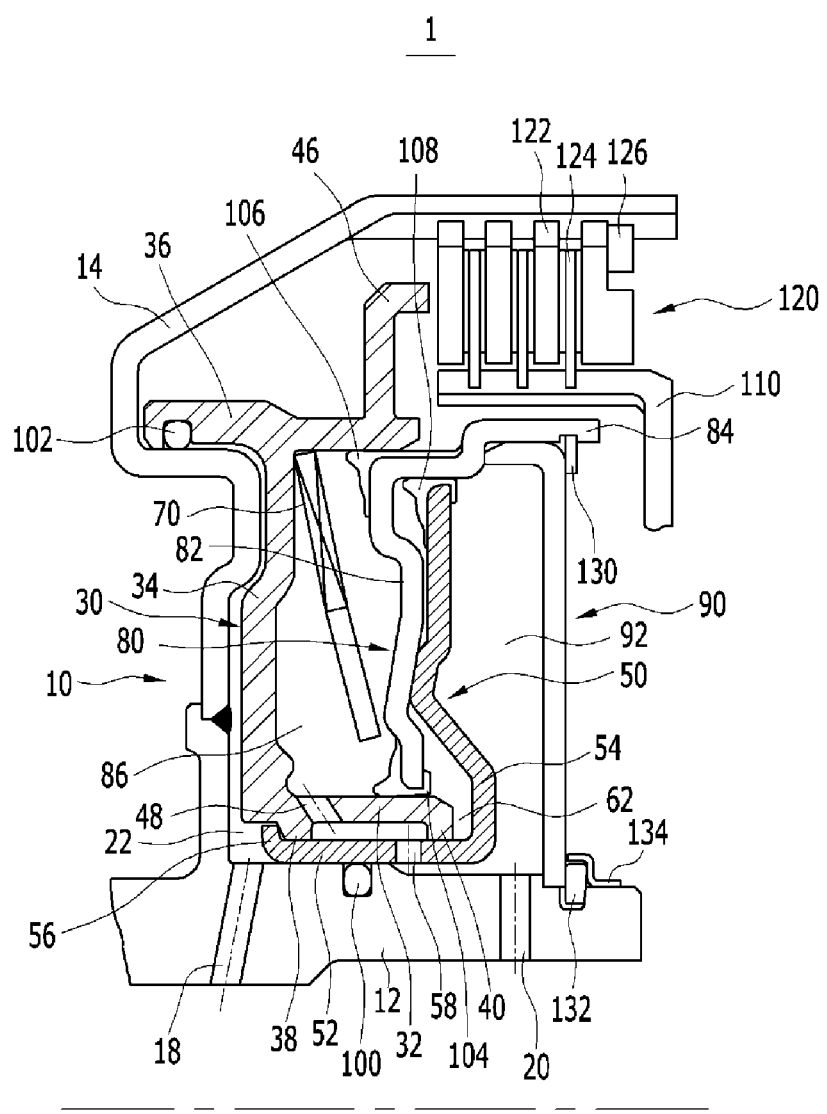
FIG. 5 to FIG. 10 are cross-sectional views showing a power transmission device including a balance chamber in accordance with various exemplary embodiments of the present invention.

FIG. 5 is a cross-sectional view illustrating a power transmission device in accordance with a second exemplary embodiment of the present invention.

The power transmission device in accordance with the second exemplary embodiment of the present invention has different structures in the first piston 30 and the first balance wall 80 as compared with the first exemplary embodiment of the present invention.

The first piston 30 includes the first piston inner diametric portion 32, the first piston body 34, the first piston outer diametric portion 36, and a first piston presser 46. Herein, the first piston inner diametric portion 32, the first piston body 34, and the first piston outer diametric portion 36 are substantially the same as those of the first exemplary embodiment. The first piston presser 46 is radially externally extended from the other side of the first piston outer diametric portion 36 to be bent toward the clutch pack 120.

The first balance wall 80 includes the first balance body 82 and the first balance extension 84. The first balance extension 84 is axially extended from an outer diametric end of the first balance body 82.

With such structures of the first piston 30 and the first balance wall 80, the clutch pack 120 may be radially disposed at a more external portion, thereby increasing the sizes of the second balance chamber 92 and the second piston chamber 62.

Figure 6:
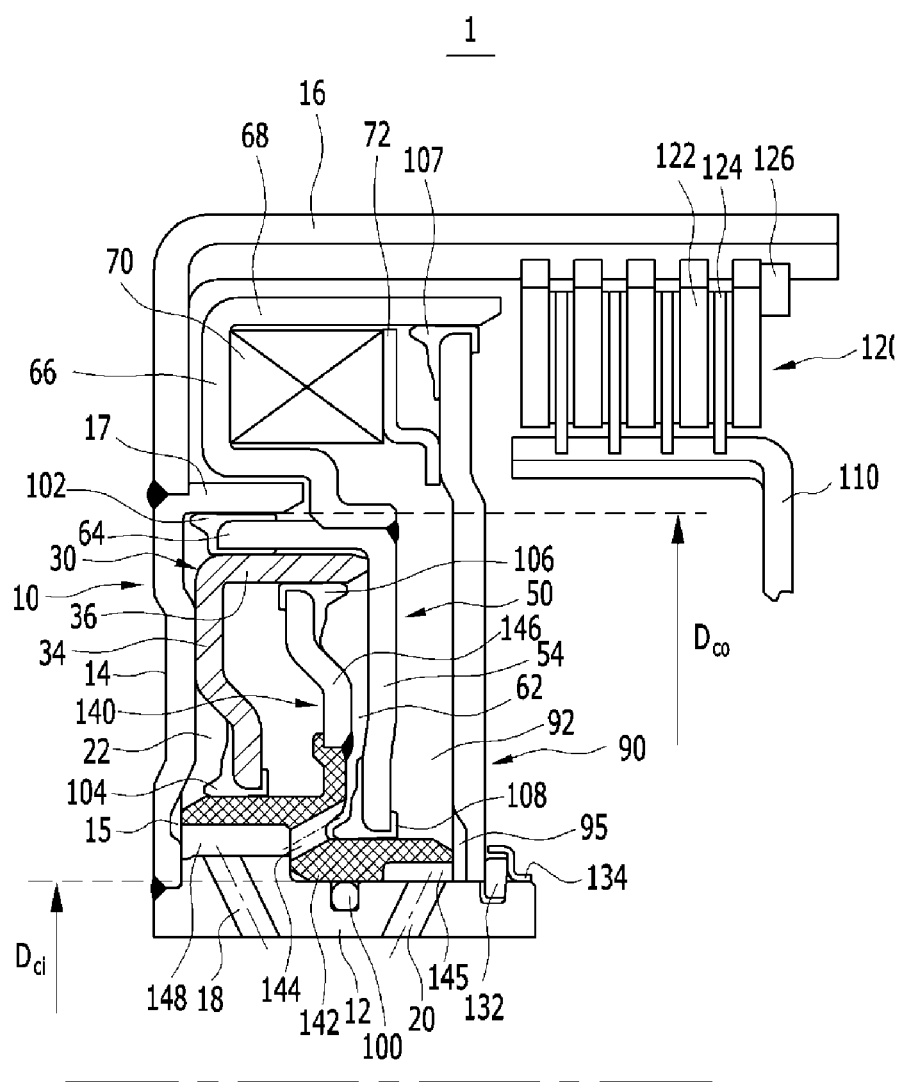

FIG. 6 is a cross-sectional view illustrating a power transmission device in accordance with a third exemplary embodiment of the present invention.

As shown in FIG. 6, the power transmission device 1 in accordance with the third exemplary embodiment of the present invention includes the housing 10, the clutch pack 120, the power transmission hub 110, the first and second pistons 30 and 50, and the return spring 70. The power transmission device 1 further includes a retainer 140 and the second balance wall 90. In the power transmission device 1 in accordance with the third exemplary embodiment of the present invention, the descriptions related to the clutch pack 120 and the power transmission hub 110 will be omitted.

In the third exemplary embodiment, the housing 10 forming a mounting space may be formed by connecting three members 12, 14, and 16 to each other, or may be formed as a single body.

The first member 12 is operatively or directly connected to an input shaft (not shown), and includes a part that is extended in an axial direction. The operating fluid supply hole 18 and the balance fluid supply hole 20 may be formed at the axially extended part.

The second member 14 is connected to one end of the first member 12, and is radially externally extended. Further, an outer diametric portion of the second member 14 is axially bent to form a housing middle portion 17.

The third member 16 includes a radially extended part that is connected to an outer diametric end of the second member 14, and a part that is axially extended from an outer diametric end of the axially extended part. Splines or teeth may be formed on an inner circumferential surface of the axially extended part of the third member 16.

The first piston 30 is disposed in the mounting space, particularly a space defined by the first member 12 and the second member 14. The first piston chamber 22 is formed between the first piston 30 and the housing 10. At least one groove 15 is circumferentially formed at a portion of the second member 14 to fluidly communicate the operating fluid supply hole 18 with the piston chamber 22. In other words, the first piston chamber 22 is fluidly communicated with the operating fluid supply hole 18 through the groove 15 to be supplied with the operating fluid. The first piston 30 includes the first piston body 34 and the first piston outer diametric portion 36.

The first piston body 34 is radially formed, and the first piston outer diametric portion 36 is axially formed from an outer diametric end of the first piston body 34.

The retainer 140 is disposed on the first member 12, and includes a retainer inner diameter portion 142 and a retainer extension 146.

The retainer inner diameter portion 142 is axially formed, and has one end and the other end that are respectively brought into contact with a lower end portion of the second member 14 and the second balance wall 90. Accordingly, an axial movement of the retainer inner diameter portion 142 is blocked by the second member 14 and the second balance wall 90. A space 148 which is communicated with the operating fluid supply hole 18 is formed at one side of the inner circumferential surface of the retainer inner diameter portion 142, and a space 145 which is communicated with the balance fluid supply hole 20 is formed at the other side of the inner circumferential surface of the retainer inner diameter portion 142. Additionally, the sealing member 100 is provided between the first member 12 and a middle portion of the inner diametric surface of the retainer inner diameter portion 142 to close and seal the space 148 which is communicated with the operating fluid supply hole 18 and the space 145 which is communicated with the balance fluid supply hole 20. Further, at least one groove 95 is formed along the circumferential direction at a portion of the second balance wall 90 which is brought into contact with the retainer inner diameter portion 142 to communicate the balance fluid supply hole 20 with the second balance chamber 92. In addition, an operating fluid path 144 for connecting the space 148 which is communicated with the operating fluid supply hole 18 to the second piston chamber 62 may be formed at the retainer inner diameter portion 142 so as to allow a fluid to flow therethrough. The first piston body 34 is mounted on the retainer inner diameter portion 142, and a sealing member 104 is interposed between the retainer inner diameter portion 142 and an inner side end of the first piston body 34 to maintain air tightness of the first piston chamber 22.

The retainer extension 146 is coupled to the retainer inner diameter portion 142, and is radially formed. An outer side end of the retainer extension 146 is extended to the first piston outer diametric portion 36, and a sealing member 106 is interposed between the first piston outer diametric portion 36 and the outer side end of the retainer extension 146.

The second piston 50 is mounted on the retainer inner diameter portion 142, and includes the second piston body 54, a second piston middle portion 64, a second piston connecting portion 66, and a second piston presser 68. The second piston 50, the first piston 30, and the retainer 140 form the second piston chamber 62.

The second piston body 54 is radially externally formed on the retainer inner diameter portion 142. The other end of the first piston outer diametric portion 36 comes into contact with the second piston body 54, so that the first piston 30 and the second piston 50 are configured to be axially movable together. Further, a sealing member 108 is interposed between the retainer inner diameter portion 142 and an inner side end of the second piston body 54.

The second piston middle portion 64 is axially formed from an outer side end of the second piston body 54 toward the housing 10. The second piston middle portion 64 is located at a radial inner side than the housing middle portion 17, and the sealing member 102 closely contacting with the second piston middle portion 64, the housing middle portion 17, and the first piston outer diametric portion 36 is provided to maintain air tightness of the first chamber 22 and the second piston chamber 62.

It is also possible to fluidly communicate the first piston chamber 22 with the first piston outer diametric portion 36 by separating the second piston middle portion 64 and the first piston outer diametric portion 36 from each other. In this case, the sealing member 102 contacts with the housing middle portion 17.

The second piston connecting portion 66 is radially externally formed on an outer circumferential surface of the second piston middle portion 64, and the second piston presser 68 is axially extended from an outer side end of the second piston connecting portion 66 to the clutch pack 120.

The second balance wall 90 is disposed at an axially opposite side to the first piston 30 with reference to the second piston 50. The second balance wall 90 is radially mounted between the first member 12 and the second piston presser 68, and the second balance chamber 92 which is communicated with the balance fluid supply hole 20 is formed between the second balance wall 90 and the second piston 50. An axial movement of an inner diametric end of the second balance wall 90 is blocked by one end of the retainer inner diameter portion 142 and the support member 132 mounted in the first member 12. Further, the escape-preventing ring 134 which covers an outer circumferential surface of the support member 132 is placed on the first member 12 to prevent the support member 132 from escaping from the first member 12. A sealing member 107 is interposed between the second piston presser 68 and an outer side end of the second balance wall 90 to maintain air tightness of the second balance chamber 92.

A spring support ring 72 is mounted on the second balance wall 90, and the return spring 70 is disposed between the spring support ring 72 and the second piston connecting portion 66 to apply a resilient force to the second piston 50.

In accordance with the third exemplary embodiment of the present invention, when an operating fluid is supplied through the operating fluid supply hole 18, the operating fluid is supplied to the first piston chamber 22 through at least one groove 15 formed at the portion of the second member 14 which is brought into contact with the retainer inner diameter portion 142, and is supplied to the second piston chamber 62 through the space 148 and the operating fluid path 144. Further, since the other end of the first piston outer diametric portion 36 is brought into contact with the second piston body 54, the first piston 30 and the second piston 50 are moved together in a rightward direction of the drawing by the action of the operating hydraulic pressure so as to push the clutch pack 120.

Further, once the operating fluid is exhausted, the return spring 70 pushes the second piston connecting portion 66 to move the second piston 50 in a leftward direction of the drawing, and the second piston body 54 pushes the first piston outer diametric portion 36 in the leftward direction of the drawing.

In accordance with the third exemplary embodiment of the present invention, the size of the second balance chamber 92 can be increased. Accordingly, it is possible to obtain the centrifugal pressure that is sufficient to counteract the centrifugal hydraulic pressure of the first and second piston chambers 22 and 62.

Figure 7:
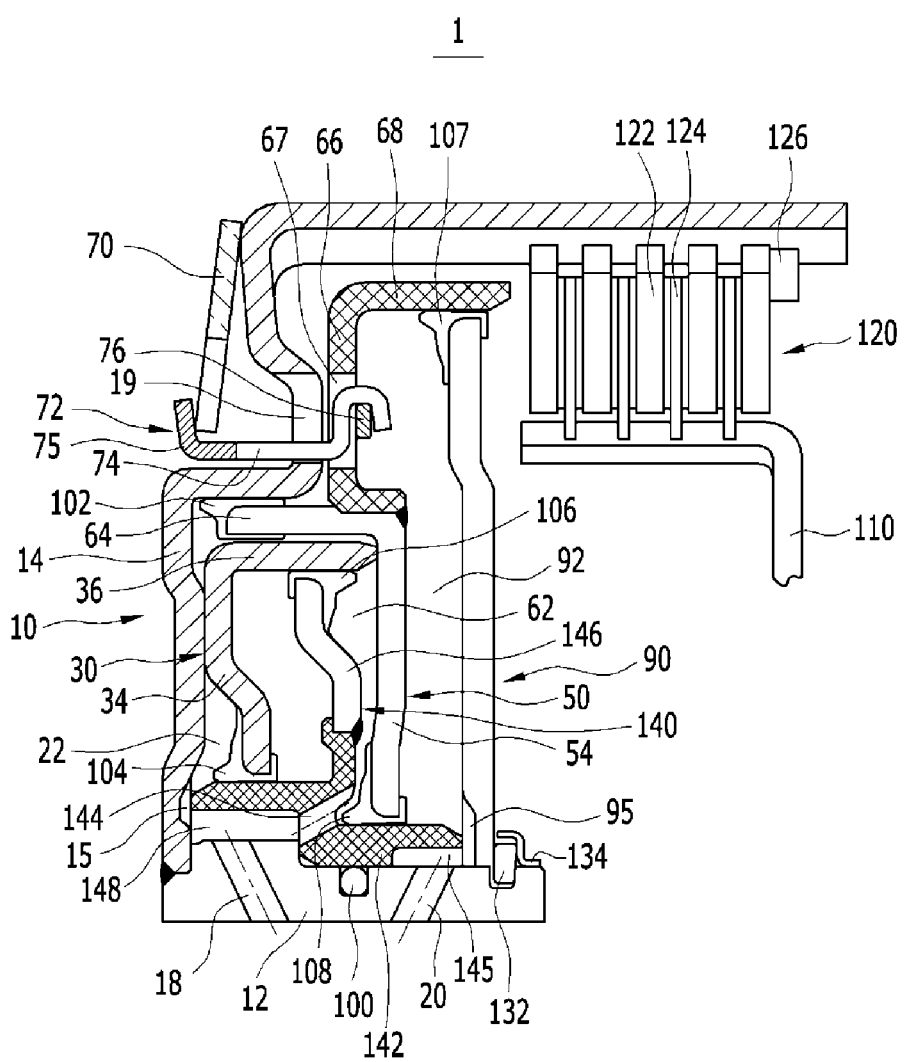

FIG. 7 is a cross-sectional view illustrating a power transmission device in accordance with a fourth exemplary embodiment of the present invention. The fourth exemplary embodiment of the present invention is a modification of the power transmission device in accordance with the third exemplary embodiment of the present invention.

In accordance with the fourth exemplary embodiment of the present invention, the return spring 70 is mounted to an outer side (e.g., a left side of the drawing) of the housing 10. For this purpose, mounting holes 19 and 67 are respectively formed at an outer diametric portion of the housing 10 and the second piston connecting portion 66 corresponding thereto, and the spring support ring 72 is mounted to penetrate through the mounting holes 19 and 67. The spring support ring 72 includes a rim 75 and at least one finger 74, and the finger 74 penetrates through the mounting holes 19 and 67 and then bends. Further, a mounting ring 76 is mounted at a bent portion of the finger 74 to secure the finger 74 to the second piston 50. The rim 75 of the spring support ring 72 is also bent, and the return spring 70 is supported at a bent portion of the rim 75 and one side of the outer diametric portion of the housing 10 to apply an elastic force against the operating force of the first and second pistons 30 and 50, to the second piston 50.

Figure 8:
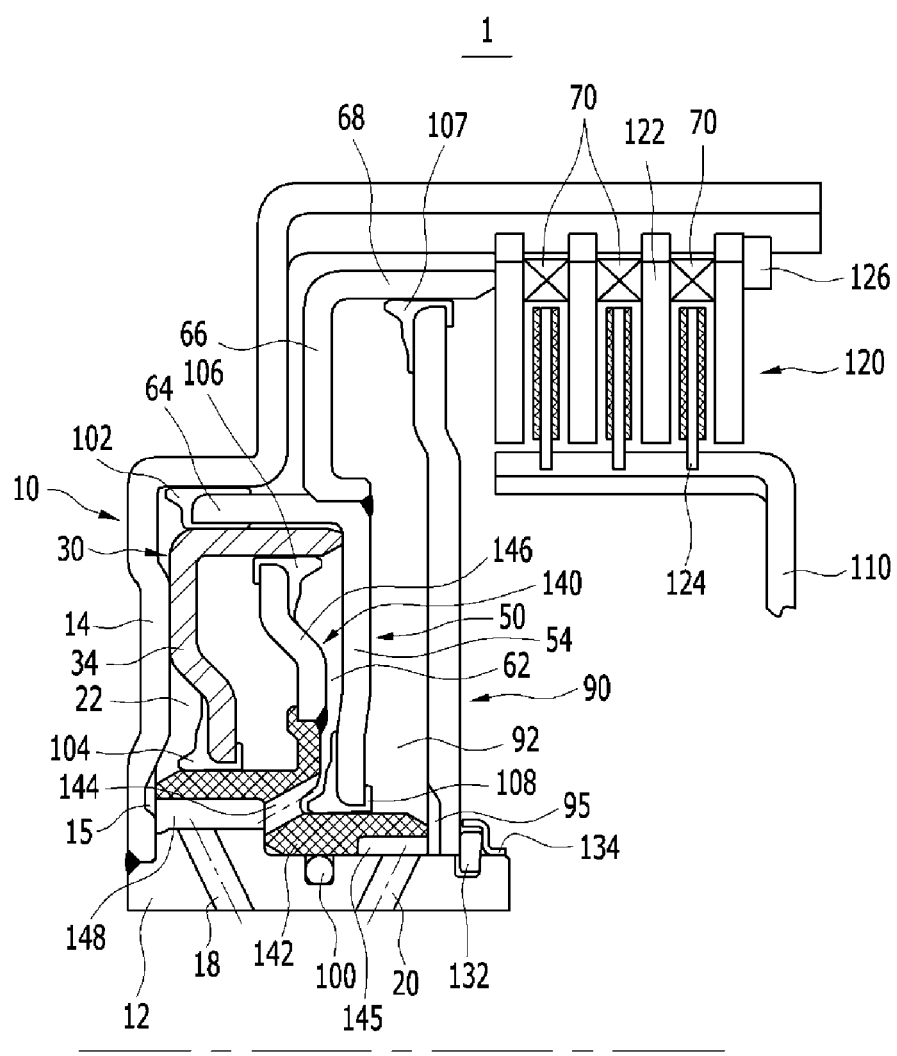

FIG. 8 is a cross-sectional view illustrating a power transmission device in accordance with a fifth exemplary embodiment of the present invention. The fifth exemplary embodiment of the present invention is a modification of the power transmission device in accordance with the third exemplary embodiment of the present invention.

In accordance with the fifth exemplary embodiment of the present invention, the return spring 70 is disposed between adjacent separate plates 122. As the return spring 70 is disposed between the adjacent separate plates 122, a clearance can be secured between the separate plates 122 and the friction disk 124, thereby reducing a drag torque that is generated when the power transmission device 1 is released. Moreover, since the return spring 70 is mounted in the clutch pack 120, it is possible to compactly design the power transmission device 1.

Figure 9:
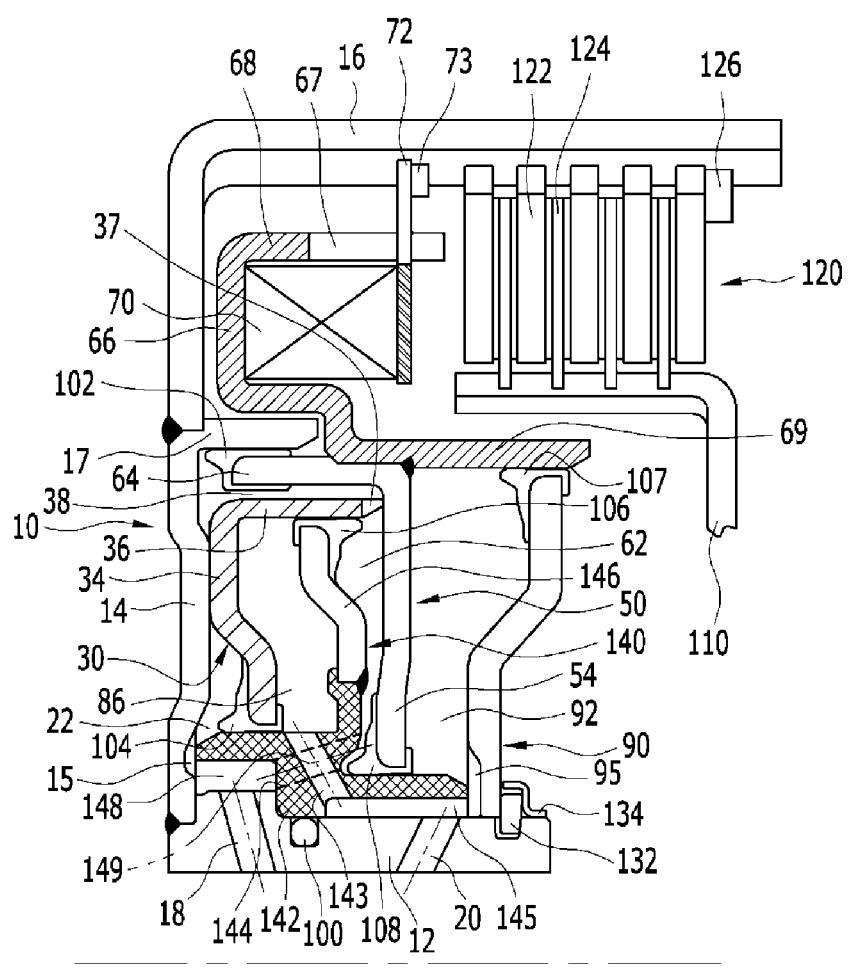

FIG. 9 is a cross-sectional view illustrating a power transmission device in accordance with a sixth exemplary embodiment of the present invention.

The power transmission device 1 in accordance with the sixth exemplary embodiment of the present invention has different structures in the retainer 140, the second piston 50, and the second balance wall 90 as compared with the third exemplary embodiment of the present invention.

The retainer 140 is mounted on the first member 12, and includes a retainer inner diameter portion 142 and a retainer extension 146. The retainer 140 and the first piston 30 form the first balance chamber 86.

The retainer inner diameter portion 142 is axially formed, and has one end and the other end that are respectively brought into contact with a lower end portion of the second member 14 and the second balance wall 90. Accordingly, an axial movement of the retainer inner diameter portion 142 is blocked by the second member 14 and the second balance wall 90. The space 148 which is communicated with the operating fluid supply hole 18 is formed at one side of the inner circumferential surface of the retainer inner diameter portion 142, and the space 148 is fluidly communicated with the operating fluid path 144 formed at the retainer inner diameter portion 142.

The space 145 which is communicated with the balance fluid supply hole 20 is formed at the other side of the inner circumferential surface of the retainer inner diameter portion 142. Further, the sealing member 100 is provided between the first member 12 and a middle portion of the inner diametric surface of the retainer inner diameter portion 142 to close and seal the space 148 which is communicated with the operating fluid supply hole 18 and the space 145 which is communicated with the balance fluid supply hole 20. At least one groove 15 is formed along a circumferential direction at a portion of the second member 14 which is brought into contact with the retainer inner diameter portion 142 to communicate the operating fluid supply hole 18 with the first piston chamber 22. Further, at least one groove 95 is formed along the circumferential direction at a portion of the second balance wall 90 which is brought into contact with the retainer inner diameter portion 142 to communicate the balance fluid supply hole 20 with the second balance chamber 92. In addition, a balance fluid path 143 for connecting the space 145 which is communicated with the balance fluid supply hole 20 to the first balance chamber 86 may be formed at the retainer inner diameter portion 142 so as to allow a fluid to flow therethrough. The first piston body 34 is mounted on the retainer inner diameter portion 142, and the sealing member 104 is interposed between the retainer inner diameter portion 142 and an inner side end of the first piston body 34 to maintain air tightness of the first piston chamber 22.

The retainer extension 146 is connected to the retainer inner diameter portion 142, and is radially formed. An outer side end of the retainer extension 146 is extended to the first piston outer diametric portion 36, and the sealing member 106 is interposed between the first piston outer diametric portion 36 and the outer side end of the retainer extension 146.

The second piston 50 is mounted on the retainer inner diameter portion 142, and includes the second piston body 54, the second piston middle portion 64, the second piston connecting portion 66, a second piston protrusion 69, and the second piston presser 68. The second piston 50, the first piston 30, and the retainer 140 form the second piston chamber 62.

The second piston body 54 is radially externally formed on the retainer inner diameter portion 142. The other end of the first piston outer diametric portion 36 may come into contact with the second piston body 54, so that the first piston 30 and the second piston 50 are configured to be axially movable together. Further, the sealing member 108 is interposed between the retainer inner diameter portion 142 and an inner side end of the second piston body 54.

The second piston middle portion 64 is axially formed from an outer side end of the second piston body 54 toward the housing 10. The second piston middle portion 64 is located at a radially inner side than the housing middle portion 17, and the sealing member 102 is provided between the second piston middle portion 64 and the housing middle portion 17. Further, the second piston middle portion 64 is radially separated from the first piston outer diametric portion 36, and thus an operating fluid supplied to the first piston chamber 22 can be supplied to the second piston chamber 62 through a gap 38 formed between the second piston middle portion 64 and the first piston outer diametric portion 36 and at least one operating fluid path 37 that is circumferentially provided at the other end of the first piston outer diametric portion 36.

The second piston connecting portion 66 is radially externally formed on an outer circumferential surface of the second piston middle portion 64, and the second piston protrusion 69 is integrally formed at the second piston connecting portion 66 and is axially extended away from the housing 10. The second piston body 54 and the second piston connecting portion 66 may be integrally formed.

The second piston presser 68 is axially extended from an outer side end of the second piston connecting portion 66 to the clutch pack 120. The mounting hole 67 or a finger is formed in the second piston presser 68, and the spring support ring 72 is extended through the mounting hole 67 or the finger while being mounted on the inner circumferential surface of the third member 16 through a support member 73.

The second balance wall 90 is disposed at an axially opposite side to the first piston 30 with reference to the second piston 50. The second balance wall 90 is radially mounted between the first member 12 and the second piston protrusion 69, and the second balance chamber 92 which is communicated with the balance fluid supply hole 20 is formed between the second balance wall 90 and the second piston 50. An axial movement of an inner diametric end of the second balance wall 90 is blocked by one end of the retainer inner diameter portion 142 and the support member 132 mounted in the first member 12. Further, the escape-preventing ring 134 which covers an outer circumferential surface of the support member 132 is provided on the first member 12 to prevent the support member 132 from escaping from the first member 12. The sealing member 107 is interposed between the second piston protrusion 69 and an outer side end of the second balance wall 90 to maintain air tightness of the second balance chamber 92.

The return spring 70 is disposed between the spring support ring 72 and the second piston connecting portion 66 to apply a resilient force to the second piston 50.

Figure 10:
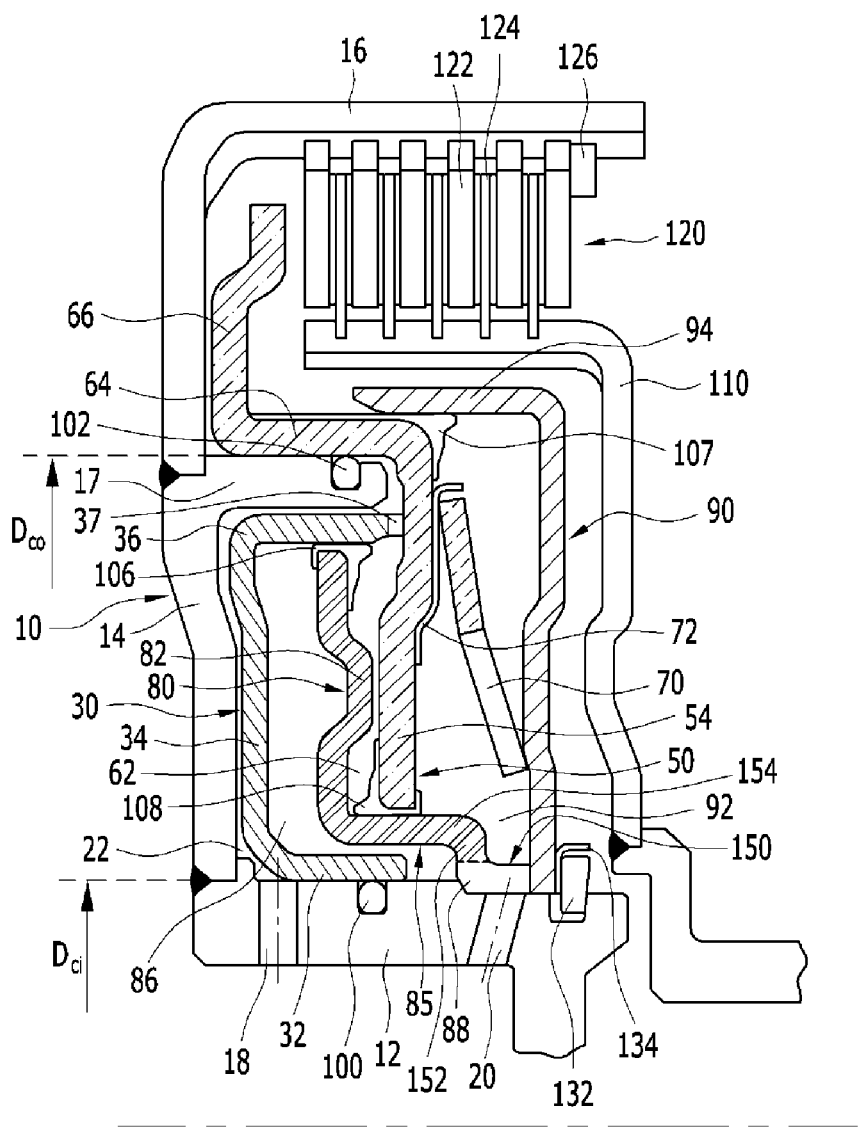

FIG. 10 is a cross-sectional view illustrating a power transmission device in accordance with a seventh exemplary embodiment of the present invention.

As shown in FIG. 10, the power transmission device 1 in accordance with the seventh exemplary embodiment of the present invention includes the housing 10, the clutch pack 120, the power transmission hub 110, the first and second pistons 30 and 50, and the return spring 70. The power transmission device 1 further includes the first and second balance walls 80 and 90. In the power transmission device 1 in accordance with the seventh exemplary embodiment of the present invention, the descriptions related to the housing 10, the clutch pack 120, and the power transmission hub 110 will be omitted.

The first piston 30 is disposed in the mounting space, and the first piston chamber 22 is formed between the first piston 30 and the housing 10. The first piston chamber 22 is fluidly communicated with the operating fluid supply hole 18 and receives the operating fluid. The first piston 30 includes the first piston inner diametric portion 32, the first piston body 34, and the first piston outer diametric portion 36. The first piston inner diametric portion 32, the first piston body 34, and the first piston outer diametric portion 36 are integrally formed.

The first piston inner diametric portion 32 is axially disposed, and the sealing member 100 is interposed between the first piston inner diametric portion 32 and the first member 12 to maintain air tightness of the first piston chamber 22.

The first piston body 34 is radially externally formed at one end of the first piston inner diametric portion 32, and the first piston outer diametric portion 36 is connected to an outer diametric end of the first piston body 34 to extend in the axial direction. The first piston outer diametric portion 36 is axially separated from the housing middle portion 17, and at least one operating fluid path 37 is formed in the circumferential direction at the other end of the first piston outer diametric portion 36. Accordingly, the first piston chamber 22 and the second piston chamber 62 are communicated with each other through the operating fluid path 37 and a gap formed between the first piston outer diametric portion 36 and the housing middle portion 17.

The first balance wall 80 is mounted on the first member 12, and the first member 12, the first piston 30, and the first balance wall 80 form the first balance chamber 86. The balance fluid supply hole 20 is formed in the first member 12, close to the contact portion between the first balance wall 80 and the first member 12, and a balance fluid path 88 is formed in the first balance wall 80. The balance fluid path 88 is communicated with both the first balance chamber 86 and the second balance chamber 92. The first balance wall 80 includes a first balance inner diametric portion 85 and a first balance body 82.

The first balance inner diametric portion 85 includes a mounting portion 150 that is mounted on the first member 12, a part 152 that is radially bent from one end of the mounting portion 150, and a part 154 that is radially separated from the first piston inner diametric portion 32 and is axially extended toward the first piston body 34. The balance fluid path 88 is formed in the mounting portion 150.

The first balance body 82 is radially extended from one end of the first balance inner diametric portion 85 toward the first piston outer diametric portion 36. The sealing member 106 is interposed between the first piston outer diametric portion 36 and an outer diametric end of the first balance body 82 to maintain air tightness of the first balance chamber 86.

The second piston 50 is mounted on the first balance inner diametric portion 85, and first piston 30, the first balance wall 80, and the second piston 50 form the second piston chamber 62. The second piston 50 includes the piston body 54, the second piston middle portion 64, and the second piston connecting portion 66.

The second piston body 54 is radially externally formed on the first balance inner diametric portion 85. The sealing member 108 is interposed between the first balance inner diametric portion 85 and an inner diametric end of the second piston body 54 to maintain air tightness of the second piston chamber 62. Further, the other end of the first piston outer diametric portion 36 is brought into contact with the second piston body 54, so that the first piston 30 and the second piston 50 are configured to be movable together. As described above, the operating fluid path 37 is formed at the other end of the first piston outer diametric portion 36 to communicate the first piston chamber 22 and the second piston chamber 62 with each other. Further, the spring support ring 72 is mounted in the second piston body 54.

The second piston middle portion 64 is bent from the outer diametric end of the second piston body 54 to axially extend toward the third member 16. The sealing member 102 is interposed between the second piston middle portion 64 and the housing middle portion 17 to maintain air tightness of the second piston chamber 62 and the first piston chamber 22.

The second piston connecting portion 66 is axially extended from one end of the second piston middle portion 64 to the vicinity of the clutch pack 120. Once an operating hydraulic pressure is supplied to the first piston chamber 22 and/or the second piston chamber 62, the second piston 50 is moved together with the first piston 30 in the rightward direction of the drawing, and the second piston connecting portion 66 applies an axial force to the clutch pack 120.

The second balance wall 90 is disposed at an axially opposite side to the first balance wall 80 with reference to the second piston body 54, and the first balance wall 80, the second piston 50, and the second balance wall 90 form the second balance chamber 92. The second balance wall 90 is mounted on the first member 12, an inner diametric portion of the second balance wall 90 is brought into contact with a mounting portion of the first balance wall 80, and an axial movement thereof is blocked by the support member 132 mounted in the first member 12. Further, the escape-preventing ring 134 which covers an outer circumferential surface of the support member 132 is provided on the first member 12 to prevent the support member 132 from escaping from the first member 12. A second balance outer diametric portion 94 that is axially extended toward the housing 10 is formed at the outer diametric portion of the second balance wall 90. The sealing member 107 is interposed between the second balance outer diametric portion 94 and the second piston middle portion 64 to maintain air tightness of the second balance chamber 92.

The return spring 70 is mounted in the second balance chamber 92. Specifically, the return spring 70 has one end and the other end that are respectively supported by the spring support ring 72 mounted in the second piston body 52 and the second balance wall 90, thereby applying an elastic force against the operating force of the first and second pistons 30 and 50, to the second piston 50.

FIG. 11 to FIG. 20 are cross-sectional views showing a power transmission device including no balance chamber in accordance with various exemplary embodiments of the present invention.

The aforementioned method of determining the return spring force may be applied to the power transmission device shown in FIG. 11 to FIG. 20. Particularly, the power transmission device 200 shown in FIG. 11 to FIG. 20 may have a housing 210 that is at standstill.

Figure 11:
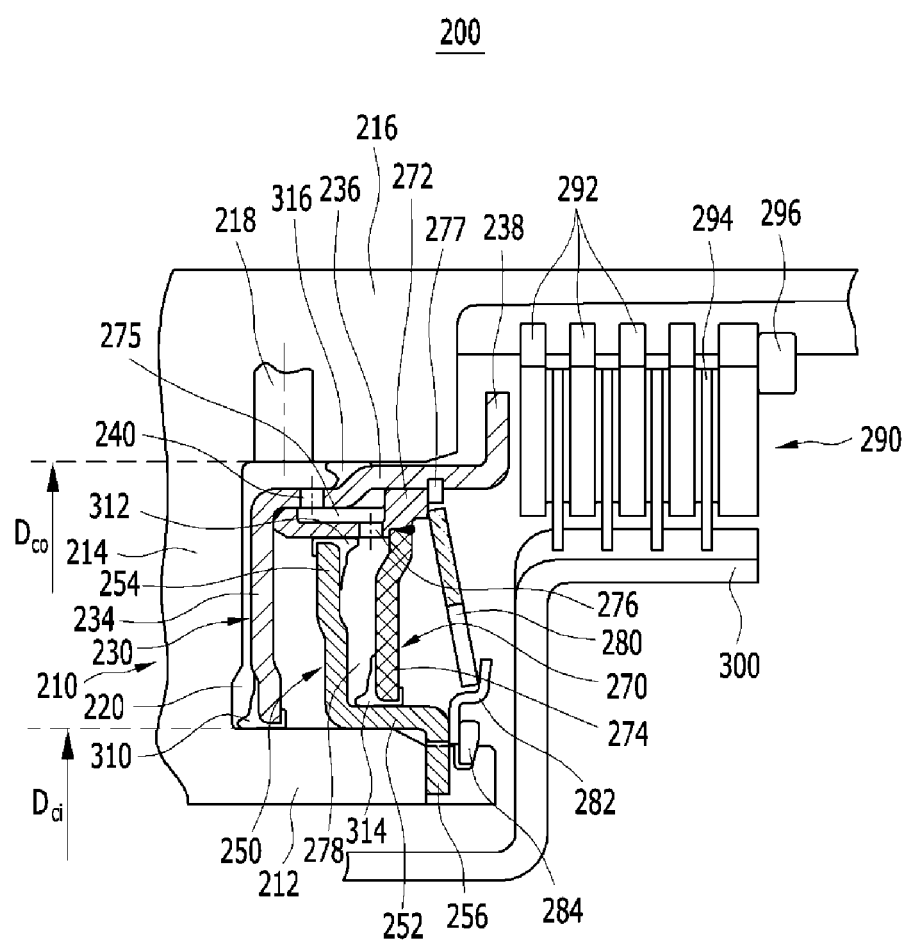
FIG. 11 to FIG. 20 are cross-sectional views showing a power transmission device including no balance chamber in accordance with various exemplary embodiments of the present invention.

FIG. 11 is a cross-sectional view illustrating a power transmission device in accordance with an eighth exemplary embodiment of the present invention.

As shown in FIG. 11, the power transmission device 200 in accordance with the eighth exemplary embodiment of the present invention includes the housing 210, a clutch pack 290, a power transmission hub 300, first and second pistons 230 and 270, a retainer 250, and a return spring 280. In the exemplary embodiments shown in FIG. 11 to FIG. 20, the housing 210 may be configured to rotate together with an input shaft (not shown), or may be fixed so as not to be rotated, thereby serving to stop rotation of the power transmission hub 300. In the power transmission device 200 in accordance with the eighth exemplary embodiment of the present invention, the descriptions related to the clutch pack 290 and the power transmission hub 300 will be omitted.

The housing 210 serving to form a mounting space may be a housing of a transmission when the power transmission device 200 is used for an automatic transmission. In the housing 210, an operating fluid supply hole 218 for supplying an operating hydraulic pressure may be formed. The housing 210 includes a housing inner diametric portion 212 that is axially extended, a housing connecting portion 214 that is radially externally formed at one end of the housing inner diametric portion 212, and a housing outer diametric portion 216 that is axially extended from an outer diametric end of the housing connecting portion 214.

The first piston 230 is disposed in the mounting space, and a first piston chamber 220 is formed between the first piston 230 and the housing 210. The first piston chamber 220 is fluidly communicated with the operating fluid supply hole 218 and receives the operating fluid. The first piston 230 includes a first piston body 234, a first piston outer diametric portion 236, and a first piston presser 238. The first piston body 234, the first piston outer diametric portion 236, and the first piston presser 238 may be integrally formed.

The first piston body 234 is radially formed on the housing inner diametric portion 212, and a sealing member 310 is interposed between the housing inner diametric portion 212 and an inner diametric end of the first piston body 234 to maintain air tightness of the first piston chamber 220.

The first piston outer diametric portion 236 is connected to an outer diametric end of the first piston body 234, and is axially extended toward the clutch pack 290. A sealing member 316 is interposed between the first piston outer diametric portion 236 and the housing outer diametric portion 216 to maintain air tightness of the first piston chamber 220. Further, an operating fluid path 240 is formed at the first piston outer diametric portion 236.

The first piston presser 238 is radially externally extended from the other end of the first piston outer diametric portion 236. The first piston presser 238 is configured to press the clutch pack 290 by an operating hydraulic pressure supplied to the first piston chamber 220 and a second piston chamber 278.

The retainer 250 is mounted on the housing inner diametric portion 212, and includes an axial extension 252, a radial extension 254, and an inserted portion 256. The inserted portion 256 may be formed to have a shape of a plurality of teeth.

The axial extension 252 is axially formed on the housing inner diametric portion 212.

The radial extension 254 is radially externally formed at one end of the axial extension 252.

The inserted portion 256 is radially internally bent from the other end of the axial extension 252 and is inserted into the housing inner diametric portion 212 so as to secure the retainer 250. An axial movement of the inserted portion 256 is restricted by a support member 284 mounted in the housing inner diametric portion 212, and a spring support ring 282 is interposed between the inserted portion 256 and the support member 284.

The second piston 270 is pressed and fitted into the first piston outer diametric portion 236 so as to be movable together with the first piston 230, and the retainer 250 and the second piston 270 form the second piston chamber 278. The second piston 270 includes a second piston outer diametric portion 272 and a second piston body 274.

The second piston outer diametric portion 272 is pressed and fitted into the first piston outer diametric portion 236, and an axial movement thereof is blocked by a support member 277 mounted at the first piston outer diametric portion 236. An operating fluid path 276 and a space 275 which is communicated with the operating fluid path 240 is formed at the second piston outer diametric portion 272. Accordingly, the first piston chamber 220 and the second piston chamber 278 are communicated with each other through the operating fluid paths 240 and 276 and the space 275. A sealing member 312 is interposed between the second piston outer diametric portion 272 and an outer diametric end of the radial extension 254 of the retainer 250 to maintain air tightness of the second piston chamber 278.

The second piston body 274 is welded to the other end of the second piston outer diametric portion 272, or is formed integrally therewith, and is radially internally extended. A sealing member 314 is interposed between the axial extension 252 and an inner diametric end of the second piston body 274 to maintain air tightness of the second piston chamber 278.

The return spring 280 has one end and the other end that are respectively supported by the other end of the second piston outer diametric portion 272 and the piston support ring 282. Accordingly, the return spring 280 applies a resilient force against the axial force caused by the operating hydraulic pressure, to the second piston 270.

Hereinafter, an operation of the power transmission device 200 will be described in accordance with the eighth exemplary embodiment of the present invention.

In an initial state, the power transmission hub 300 is not operatively connected to the housing 210 of the power transmission device 200. In the initial state, once an operating hydraulic pressure is supplied to the first piston chamber 220 through the operating fluid supply hole 218, the operating hydraulic pressure is supplied to the second piston chamber 278 through the operating fluid paths 240 and 276 and the space 275. The operating hydraulic pressure supplied to the first and second piston chambers 220 and 278 pushes the first piston 230 and the second piston 270 in a rightward direction of the drawing. Further, since the first piston 230 and the second piston 270 are configured to be axially movable together through being pressed and fitted into each other and by using the support member 277, axial forces of the first piston 230 and the second piston 270 are combined. Resultantly, the first piston presser 238 pushes a separate plate 292 in the rightward direction of the drawing, and the separate plate 292 and a friction disk 294 are friction-engaged with each other. Accordingly, the power transmission hub 300 and the housing 210 are fixed.

In an operating state, when the operating hydraulic pressure supplied to the first and second piston chambers 220 and 278 are exhausted, the return spring 280 pushes the second piston 270 in a leftward direction of the drawing. In this case, the first piston 230 is also moved together with the second piston 270 in the leftward direction of the drawing, and the power transmission device 200 disconnects the housing 210 and the power transmission hub 300 from each other.

Figure 12:
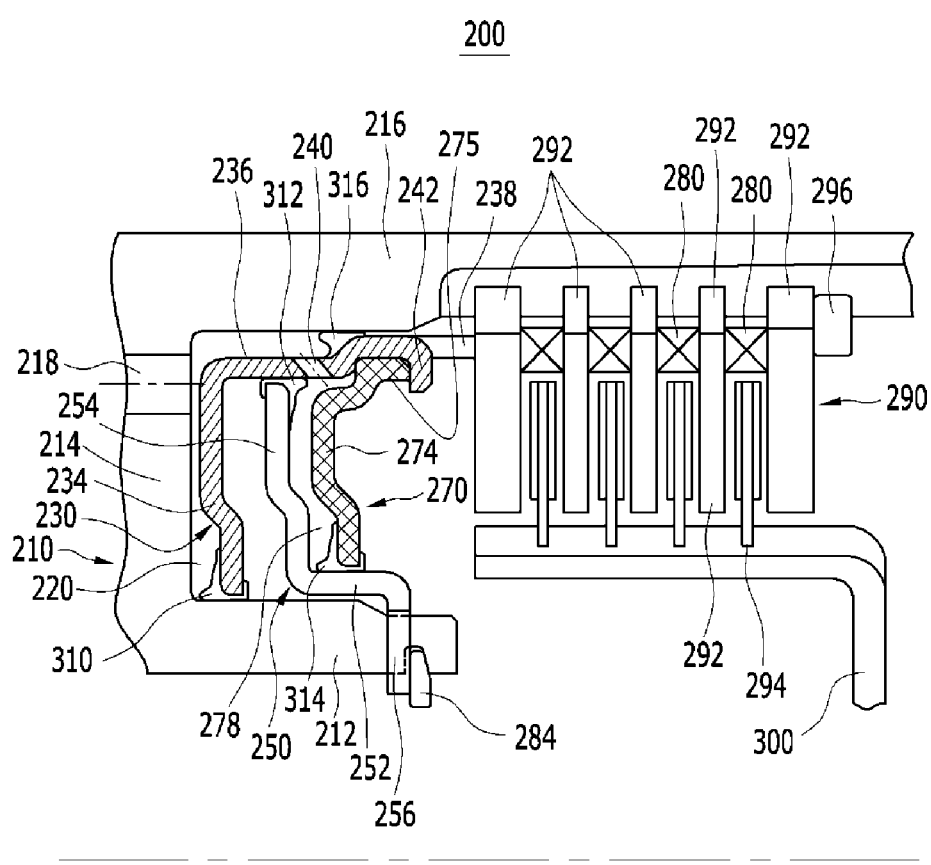

FIG. 12 is a cross-sectional view illustrating a power transmission device in accordance with a ninth exemplary embodiment of the present invention. The power transmission device in accordance with the ninth exemplary embodiment of the present invention has different structures in the piston 230 and the second piston 270 and a different arrangement in the return spring 280 as compared with the eighth exemplary embodiment of the present invention.

The first piston 230 includes the first piston body 234, the first piston outer diametric portion 236, the first piston presser 238, and a bent portion 242.

The first piston body 234 is radially formed on the housing inner diametric portion 212, and the sealing member 310 is interposed between the housing inner diametric portion 212 and an inner diametric end of the first piston body 234 to maintain air tightness of the first piston chamber 220.

The first piston outer diametric portion 236 is connected to an outer diametric end of the first piston body 234, and is axially extended toward the clutch pack 290. The sealing member 316 is interposed between the first piston outer diametric portion 236 and the housing outer diametric portion 216 to maintain air tightness of the first piston chamber 220. Further, the operating fluid path 240 is formed at the first piston outer diametric portion 236. The sealing member 312 is interposed between the first piston outer diametric portion 236 and an outer diametric end of the radial extension 254 of the retainer 250 to maintain air tightness of the second piston chamber 278.

The first piston presser 238 and the bent portion 242 are formed in a circumferential direction at the other end of the first piston outer diametric portion 236. Specifically, a plurality of fingers are formed at the other end of the first piston outer diametric portion 236, and some of the fingers are used to form the first piston presser 238 as they are and the other fingers are bent to form the bent portion 242. The first piston presser 238 presses the clutch pack 290 by the operating hydraulic pressure supplied to the first piston chamber 220 and the second piston chamber 278.

The second piston 270 is pressed and fitted into the first piston outer diametric portion 236 to be movable together with the first piston 230, and the retainer 250, the first piston 230, and the second piston 270 form the second piston chamber 278. The second piston 270 includes the second piston outer diametric portion 275 and the second piston body 274.

The second piston outer diametric portion 275 is pressed and fitted into the first piston outer diametric portion 236, and the first piston 230 and the second piston 270 are configured to be movable together through the bent portion 242.

The second piston body 274 is radially internally extended from the other end of the second piston outer diametric portion 275. The sealing member 314 is interposed between the axial extension 252 and an inner diametric end of the second piston body 274 to maintain air tightness of the second piston chamber 278.

The return spring 280 is disposed between adjacent separate plates 292.

Figure 13:
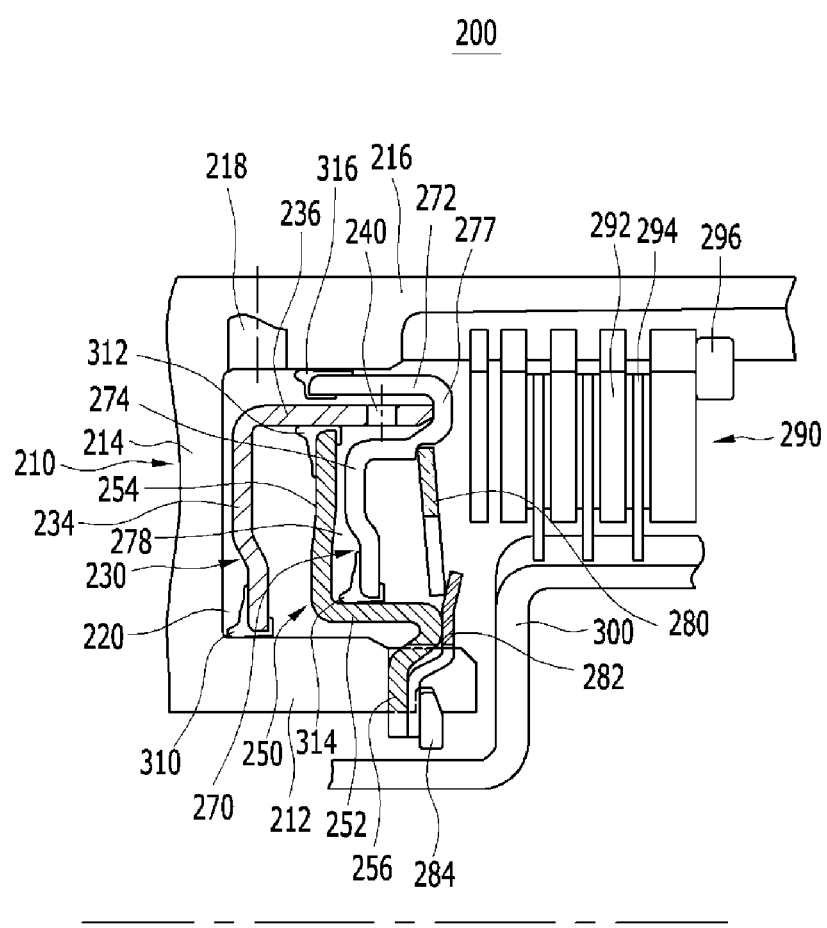

FIG. 13 is a cross-sectional view illustrating a power transmission device in accordance with a tenth exemplary embodiment of the present invention. The power transmission device in accordance with the tenth exemplary embodiment of the present invention has different structures in the first piston 230 and the second piston 270 as compared with the eighth exemplary embodiment of the present invention.

The first piston 230 includes the first piston body 234 and the first piston outer diametric portion 236.

The first piston body 234 is radially formed on the housing inner diametric portion 212, and the sealing member 310 is interposed between the housing inner diametric portion 212 and an inner diametric end of the first piston body 234 to maintain air tightness of the first piston chamber 220.

The first piston outer diametric portion 236 is connected to an outer diametric end of the first piston body 234, and is axially extended toward the clutch pack 290. The first piston outer diametric portion 236 is radially separated from the housing outer diametric portion 216. The operating fluid path 240 for communicating the first piston chamber 220 and the second piston chamber 278 with each other is formed at the first piston outer diametric portion 236.

The second piston 270 forms the second piston chamber 278 along with the retainer 250 and the first piston 230. The second piston 270 includes the second piston body 274, the second piston presser 277, and the second piston outer diametric portion 272.

The second piston body 274 is radially externally formed on the axial extension 252 of the retainer 250. The sealing member 314 is interposed between the axial extension 252 and an inner diametric end of the second piston body 274 to maintain air tightness of the second piston chamber 278.

The second piston presser 277 is formed by being bent two times in a counterclockwise direction from an outer diametric end of the second piston body 274. The other end of the first piston outer diametric portion 236 is brought into contact with the second piston presser 277, so that the first piston 230 and the second piston 270 are moved together.

The second piston outer diametric portion 272 is axially formed from one end of the second piston presser 277 away from the clutch pack 290. The second piston outer diametric portion 272 and the first piston outer diametric portion 236 are radially separated from each other to enable the operating fluid to flow therethrough. The sealing member 316 is interposed between the second piston outer diametric portion 272 and the housing outer diametric portion 216 to maintain air tightness of the first piston chamber 220.

Figure 14:
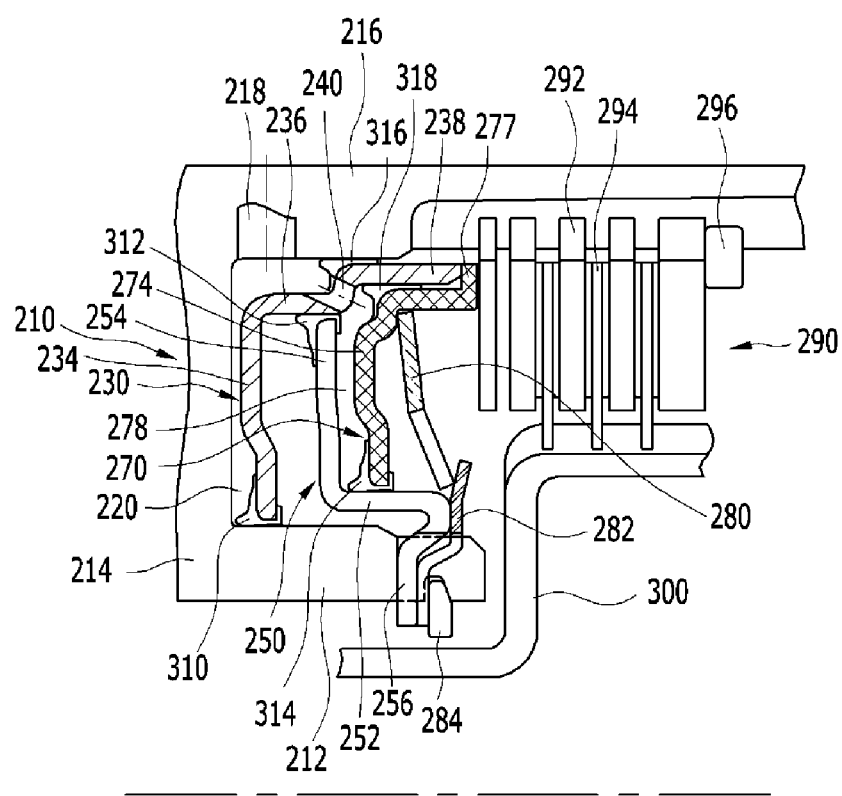

FIG. 14 is a cross-sectional view illustrating a power transmission device in accordance with an eleventh exemplary embodiment of the present invention. The power transmission device in accordance with the eleventh exemplary embodiment of the present invention has different structures in the first piston 230 and the second piston 270 as compared with the eighth exemplary embodiment of the present invention.

The first piston 230 includes the first piston body 234, the first piston outer diametric portion 236, and the first piston presser 238.

The first piston body 234 is radially formed on the housing inner diametric portion 212, and the sealing member 310 is interposed between the housing inner diametric portion 212 and an inner diametric end of the first piston body 234 to maintain air tightness of the first piston chamber 220.

The first piston outer diametric portion 236 is connected to an outer diametric end of the first piston body 234, and is axially formed toward the clutch pack 290. The operating fluid path 240 for communicating the first piston chamber 220 and the second piston chamber 278 with each other is formed at the first piston outer diametric portion 236.

The first piston presser 238 is formed by being radially bent from the other end of the first piston outer diametric portion 236 and then axially bent toward the clutch pack 290. The sealing member 316 is disposed between the first piston presser 238 and the housing outer diametric portion 216 to maintain air tightness of the first piston chamber 220.

The second piston 270 forms the second piston chamber 278 along with the retainer 250 and the first piston 230. The second piston 270 includes the second piston body 274 and the second piston presser 277.

The second piston body 274 is radially externally formed on the axial extension 252 of the retainer 250. The sealing member 314 is interposed between the axial extension 252 and the inner diametric end of the second piston body 274 to maintain air tightness of the second piston chamber 278.

The second piston presser 277 is formed by being axially bent from an outer diametric end of the second piston body 274. The second piston presser 277 is radially separated from the first piston presser 238, and a sealing member 318 is interposed between the second piston presser 277 and the first piston presser 238 to maintain air tightness of the second piston chamber 278. Further, when the first piston 230 is moved in a rightward direction of the drawing, the second piston presser 277 is caught by the first piston presser 238 and is moved in the axial direction along therewith. Conversely, when the return spring 280 pushes the second piston 270 in the leftward direction of the drawing, the second piston presser 277 pushes the first piston presser 238 in the leftward direction of the drawing.

Figure 15:
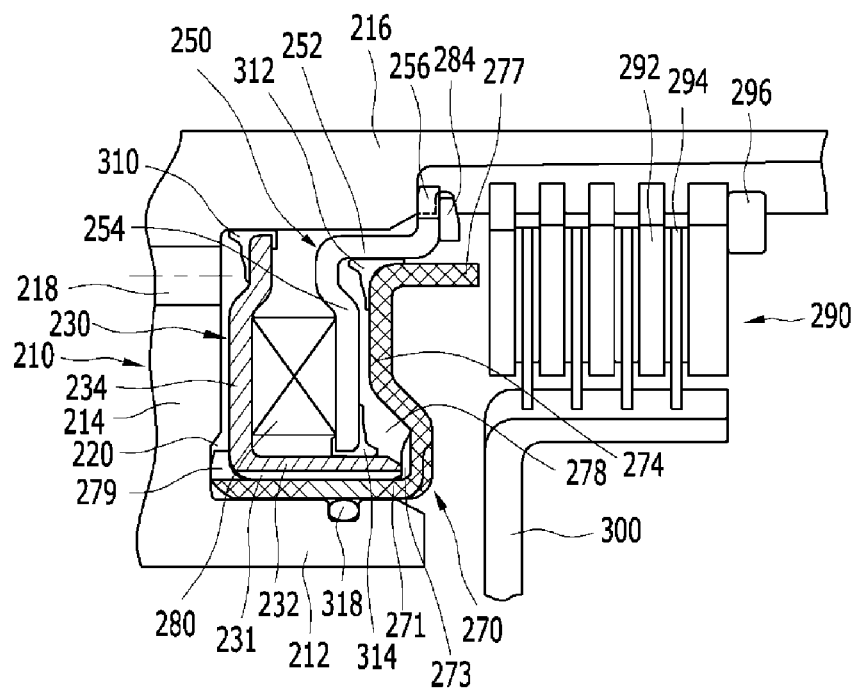

FIG. 15 is a cross-sectional view illustrating a power transmission device in accordance with a twelfth exemplary embodiment of the present invention.

As shown in FIG. 15, the power transmission device 200 in accordance with the twelfth exemplary embodiment includes the housing 210, the clutch pack 290, the power transmission hub 300, the first and second pistons 230 and 270, the retainer 250, and the return spring 280. In the power transmission device 200 in accordance with the twelfth exemplary embodiment, the descriptions related to the housing 210, the clutch pack 290, and the power transmission hub 300 will be omitted.

The first piston 230 is disposed in the mounting space, and the first piston chamber 220 is formed between the first piston 230 and the housing 210. The first piston chamber 220 is fluidly communicated with the operating fluid supply hole 218 and receives the operating fluid. The first piston 230 includes the first piston body 234 and a first piston inner diametric portion 232.

The first piston body 234 is radially formed in parallel with the housing connecting portion 214, and the sealing member 310 is interposed between the housing outer diametric portion 216 and the outer diametric end of the first piston body 234 to maintain air tightness of the first piston chamber 220.

The first piston inner diametric portion 232 is connected to the inner diametric end of the first piston body 234, and is axially extended in such a way so as to be distant from the housing connecting portion 214. The operating fluid path 231 is formed on an inner circumferential surface of the first piston inner diametric portion 232.

The retainer 250 is mounted on the housing outer diametric portion 216, and includes the axial extension 252, the radial extension 254, and the inserted portion 256.

The axial extension 252 is axially formed on the housing outer diametric portion 216.

The radial extension 254 is radially internally formed from one end of the axial extension 252. The sealing member 314 is interposed between the first piston inner diametric portion 236 and the internal diametric end of the radial extension 254 to maintain air tightness of the second piston chamber 278.

The inserted portion 256 may be radially externally bent from the other end of the axial extension 252, and is inserted into a spline portion of the housing outer diametric portion 216 so as to secure the retainer 250. The inserted portion 256 may be formed to have a tooth-like shape or the like, and an axial movement thereof may be blocked by the support member 284 mounted in the housing outer diametric portion 216.

The second piston 270 surrounds an inner circumferential surface of the first piston inner diametric portion 232, and the first piston 230 and the second piston 270 are coupled to each other by caulking to be movable together. The retainer 250, the first piston 230, and the second piston 270 form the second piston chamber 278. The second piston 270 includes a second piston inner diametric portion 271, the second piston body 274, and the second piston presser 277.

The second piston inner diametric portion 271 is contactedly disposed between the first piston inner diametric portion 232 and the housing inner diametric portion 212, and one end of the second piston inner diametric portion 271 is bent toward the first piston body 234 by caulking. An operating fluid path 279 is formed at a circumferential portion of a caulked part of the second piston inner diametric portion 271 to communicate the first piston chamber 220 with the operating fluid path 231 formed at the first piston inner diametric portion 232. The sealing member 318 is interposed between the second piston inner diametric portion 271 and the housing inner diametric portion 212 to maintain air tightness of the first piston chamber 220.

The second piston body 274 is radially externally formed at the other end of the second piston inner diametric portion 271. At least one bead is formed to axially protrude toward the housing connecting portion 214 at a portion of an inner diametric portion of the second piston body 274 by using a pressing method or the like. An operating fluid path 273 for communicating the operating fluid path 231 with the second piston chamber 278 is formed at the portion at which the bead is formed. Accordingly, the first piston chamber 220 is communicated with the second piston chamber 278 through the operating fluid paths 279, 231, and 273.

The second piston presser 277 is axially extended from the outer diametric end of the second piston body 274 toward the clutch pack 290. The sealing member 312 is interposed between the second piston presser 277 and the axial extension 252 of the retainer 250 to maintain air tightness of the second piston chamber 278.

The return spring 280 is disposed between the first piston body 234 and the radial extension 254 of the retainer 250 to apply an elastic force against an axial force caused by the operating hydraulic pressure to the first piston 230.

In the eleventh exemplary embodiment shown in FIG. 15, the first and second pistons 230 and 270, the retainer 250, and the return spring 280 may be pre-assembled as one module, and may be mounted in the housing 120.

Figure 16:
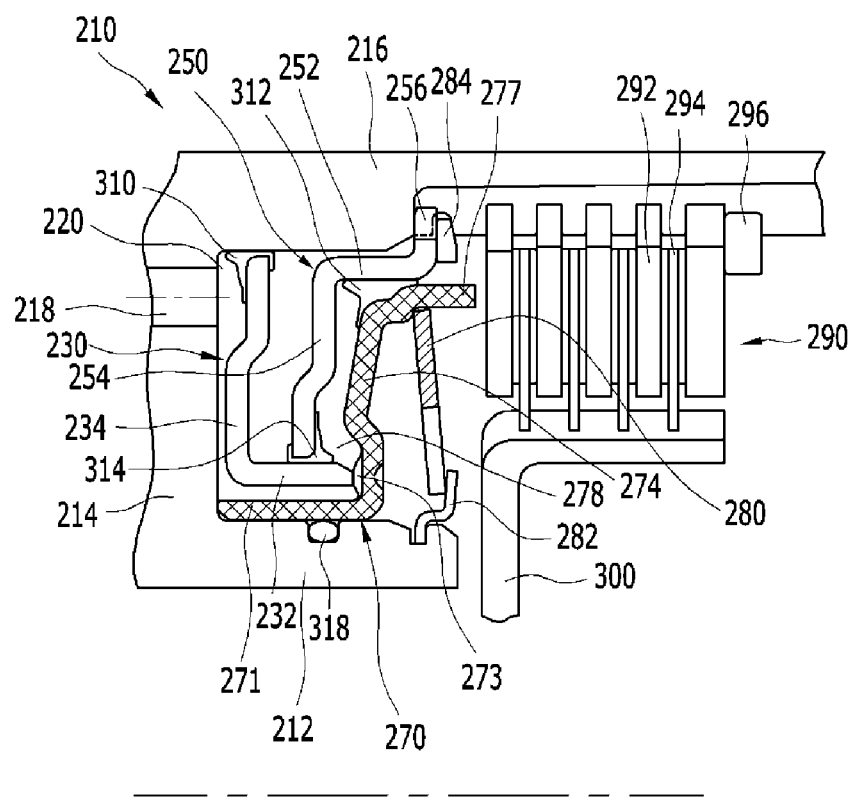

FIG. 16 is a cross-sectional view illustrating a power transmission device in accordance with a thirteenth exemplary embodiment of the present invention. The power transmission device in accordance with the thirteenth exemplary embodiment of the present invention has a different connection type of the piston 230 and the second piston 270 and a different arrangement in the return spring 280 as compared with the twelfth exemplary embodiment of the present invention.

Similar to the twelfth exemplary embodiment, the first piston 230 includes the first piston body 234 and the first piston inner diametric portion 232, and the second piston 270 includes the second piston inner diametric portion 271, the second piston body 274, and the second piston presser 277. However, the first piston inner diametric portion 232 and the second piston inner diametric portion 271 are radially separated from each other to form a path through which the operating fluid can flow. At least one bead is formed to axially protrude toward the housing connecting portion 214 at a portion of an inner diametric portion of the second piston body 274 by using a pressing method or the like, and the operating fluid path 273 is formed at the portion at which the bead is formed. Accordingly, the first piston chamber 220 is communicated with the second piston chamber 278 through the operating fluid path 273 and a gap formed between the first piston inner diametric portion 232 and the second piston inner diametric portion 271.

The return spring 280 has one end and the other end that are respectively supported by the second piston presser 277 and the spring support ring 282 mounted at the housing inner diametric portion 212 to apply an elastic force against the axial force caused by the operating hydraulic pressure to the second piston 270.

Connections of the first piston 230 with the second piston 270 will be described as follows.

When an operating hydraulic pressure is supplied to the first piston chamber 220, the operating hydraulic pressure is also supplied to the second piston chamber 278. In this case, the first piston 230 is moved in a rightward direction of the drawing to push the second piston 270, and the second piston 270 is moved in the rightward direction of drawing together with the first piston 230 by a pushing force of the first piston 230 and a pushing force of the operating hydraulic pressure supplied to the second piston chamber 278.

Further, when the operating hydraulic pressure supplied to the piston chambers 220 and 278 is exhausted, the return spring 280 pushes the second piston 270 in a leftward direction of the drawing. In this case, the second piston 270 pushes the first piston 230 in the leftward direction of the drawing.

Figure 17:
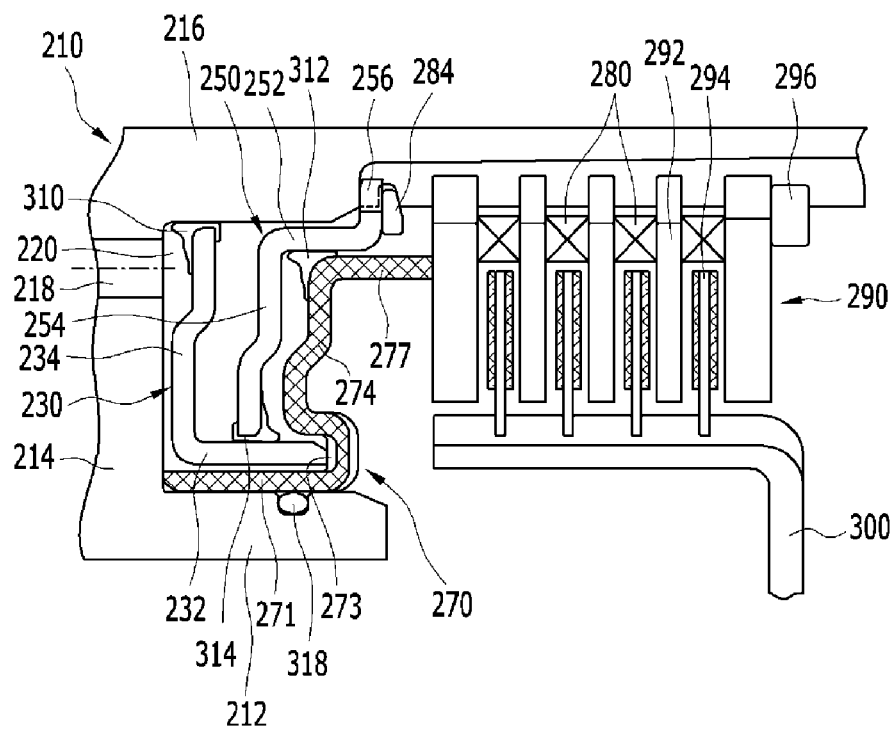

FIG. 17 is a cross-sectional view illustrating a power transmission device in accordance with a fourteenth exemplary embodiment of the present invention. The power transmission device in accordance with the fourteenth exemplary embodiment of the present invention has a different arrangement in the return spring 280 as compared with the thirteenth exemplary embodiment of the present invention.

Specifically, in accordance with the fourteenth exemplary embodiment of the present invention, the return spring 280 is disposed between adjacent separate plates 292. As described above, as the return spring 280 is disposed between the separate plates 292, it is possible to reduce a drag torque.

Figure 18:
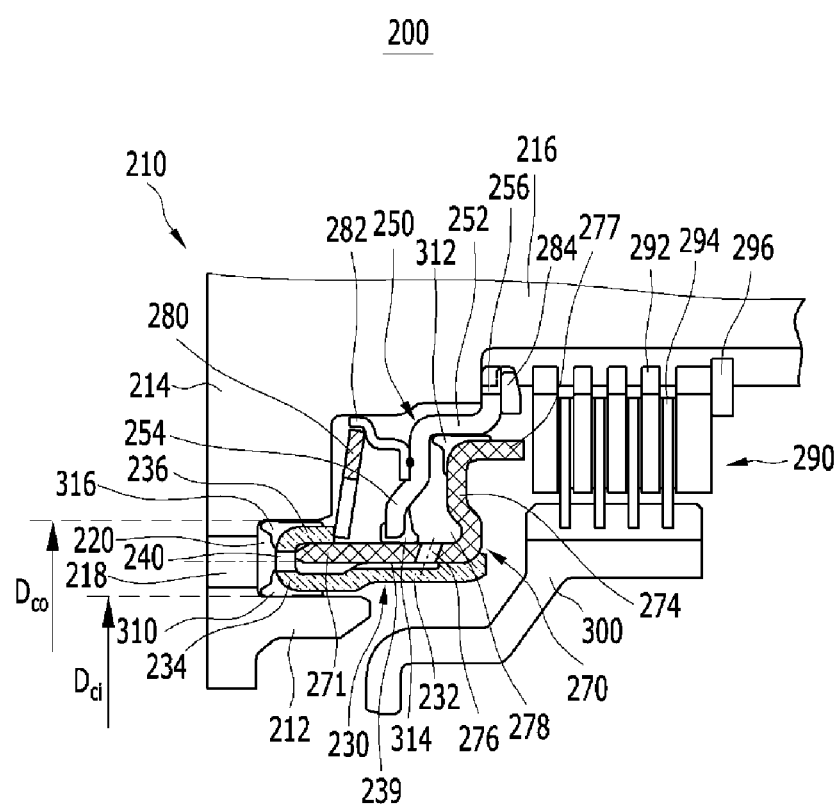

FIG. 18 is a cross-sectional view illustrating a power transmission device in accordance with a fifteenth exemplary embodiment of the present invention.

As shown in FIG. 18, the power transmission device 200 in accordance with the fifteenth exemplary embodiment of the present invention includes the housing 210, the clutch pack 290, the power transmission hub 300, the first and second pistons 230 and 270, the retainer 250, and the return spring 280. In the power transmission device 200 in accordance with the fifteenth exemplary embodiment of the present invention, the descriptions related to the clutch pack 290 and the power transmission hub 300 will be omitted.

The housing 210 serves to form a mounting space. In the housing 210, the operating fluid supply hole 218 for supplying an operating hydraulic pressure may be formed. The housing 210 includes the housing inner diametric portion 212 that is axially extended, the housing connecting portion 214 that is radially externally formed at one end of the housing inner diametric portion 212, and the housing outer diametric portion 216 that is axially extended from an outer diametric end of the housing connecting portion 214. The housing 210 of the fifteenth exemplary embodiment is the same as the housing of the eighth exemplary embodiment except for a narrow mounting space for the first piston 230.

The first piston 230 is disposed in the mounting space, and the first piston chamber 220 is formed between the first piston 230 and the housing 210. The first piston chamber 220 is fluidly communicated with the operating fluid supply hole 218 to be supplied with the operating fluid. The first piston 230 includes the first piston inner diametric portion 232, the first piston body 234, and the first piston outer diametric portion 236. The first piston inner diametric portion 232, the first piston body 234, and the first piston outer diametric portion 236 may be integrally formed.

The first piston inner diametric portion 232 is axially formed on the housing inner diametric portion 212, and the other end of the first piston inner diametric portion 232 is pressed and fitted into the second piston inner diametric portion 271 and is radially externally bent to surround a part of the second piston 270. The sealing member 310 is interposed between the first piston inner diametric portion 232 and the housing inner diametric portion 212 to maintain air tightness of the first piston chamber 220.

The first piston body 234 is formed by being radially externally bent from one end of the first piston inner diametric portion 232. The operating fluid path 240 which is communicated with the first piston chamber 220 is formed in the first piston body 234.

The first piston outer diametric portion 236 is connected to the outer diametric end of the first piston body 234, and is formed in an axial direction. The sealing member 316 is interposed between the first piston outer diametric portion 236 and the housing connecting portion 214 to maintain air tightness of the first piston chamber 220.

The retainer 250 is mounted on the housing outer diametric portion 216, and includes the axial extension 252, the radial extension 254, and the inserted portion 256.

The axial extension 252 is axially formed on the housing outer diametric portion 216.

The radial extension 254 is radially internally formed at one end of the axial extension 252. A spring support ring 282 is mounted in the radial extension 254.

The inserted portion 256 is radially externally bent from the other end of the axial extension 252 and is inserted into the housing outer diametric portion 216 so as to secure the retainer 250. An axial movement of the inserted portion 256 is blocked by the support member 284 mounted at the housing outer diametric portion 216.

The second piston 270 is pressed and fitted into the first piston outer diametric portion 236 and the first piston inner diametric portion 232 so as to be movable together with the first piston 230, and the retainer 250 and the second piston 270 form a second piston chamber 278. The second piston 270 includes the second piston inner diametric portion 271, the second piston body 274, and the second piston presser 277.

The second piston inner diametric portion 271 is axially formed, and one end of the second piston inner diametric portion 271 is inserted into a space formed by the first piston 230. A groove 239 through which the operating fluid can flow is formed at the first piston inner diametric portion 232, and the first piston inner diametric portion 232 is fluidly communicated with the operating fluid path 276 which is communicated with the second piston chamber 278. Accordingly, the second piston chamber 278 is communicated with the first piston chamber 220 through the space, the groove 239, and the operating fluid paths 240 and 276. The other end of the second piston inner diametric portion 271 is at least partially surrounded by the other end of the first piston inner diametric portion 232 that is radially bent. Accordingly, the first and second pistons 230 and 270 are moved together. The sealing member 314 is interposed between the second piston inner diametric portion 271 and the inner diametric end of the radial extension 254 of the retainer 250.

The second piston body 274 is radially externally from the other end of the second piston inner diametric portion 271.

The second piston presser 277 is axially extended from the outer diametric end of the second piston body 274 toward the clutch pack 290. The sealing member 312 is interposed between the second piston presser 277 and the axial extension 252 of the retainer 250 to maintain air tightness of the second piston chamber 278.

The return spring 280 has one end and the other end that are respectively supported by the other end of the first piston outer diametric portion 236 and the piston support ring 282. Accordingly, the return spring 280 applies an elastic force against the axial force caused by the operating hydraulic pressure, to the first piston 230.

In the fifteenth exemplary embodiment shown in FIG. 18, the first and second pistons 230 and 270, the retainer 250, and the return spring 280 may be pre-assembled as one module, and may be mounted in the housing 210.

Figure 19:
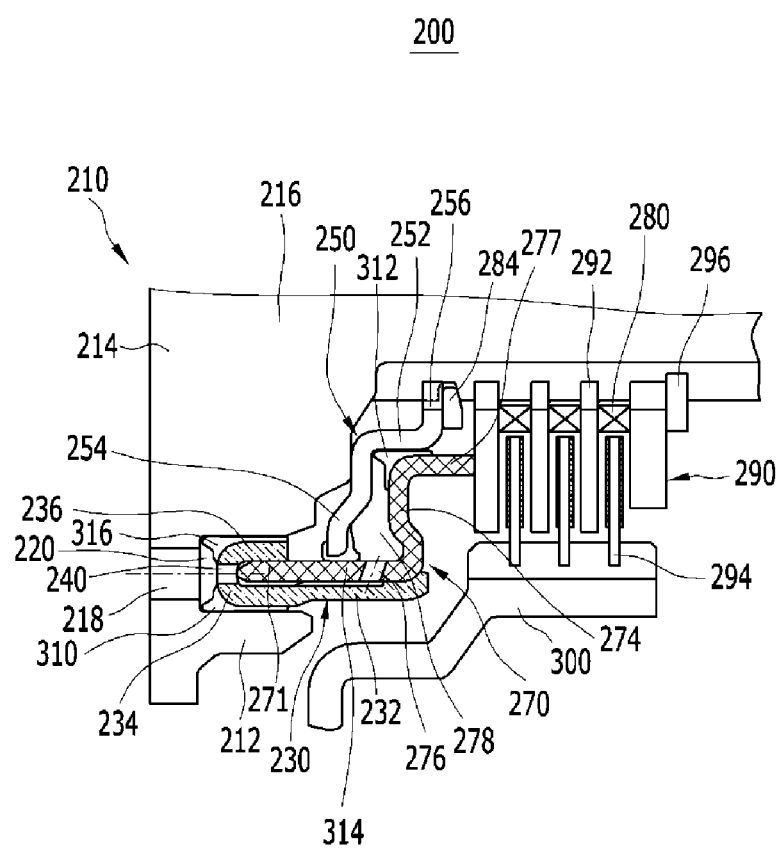

FIG. 19 is a cross-sectional view illustrating a power transmission device in accordance with a sixteenth exemplary embodiment of the present invention. The power transmission device in accordance with the sixteenth exemplary embodiment of the present invention has a different arrangement in the return spring 280 as compared with the fifteenth exemplary embodiment of the present invention.

Specifically, in accordance with the sixteenth exemplary embodiment of the present invention, a plurality of return springs 280 are disposed between adjacent separate plates 292. As described above, as the return spring 280 is disposed between the separate plates 292, it is possible to reduce a drag torque.

Figure 20:
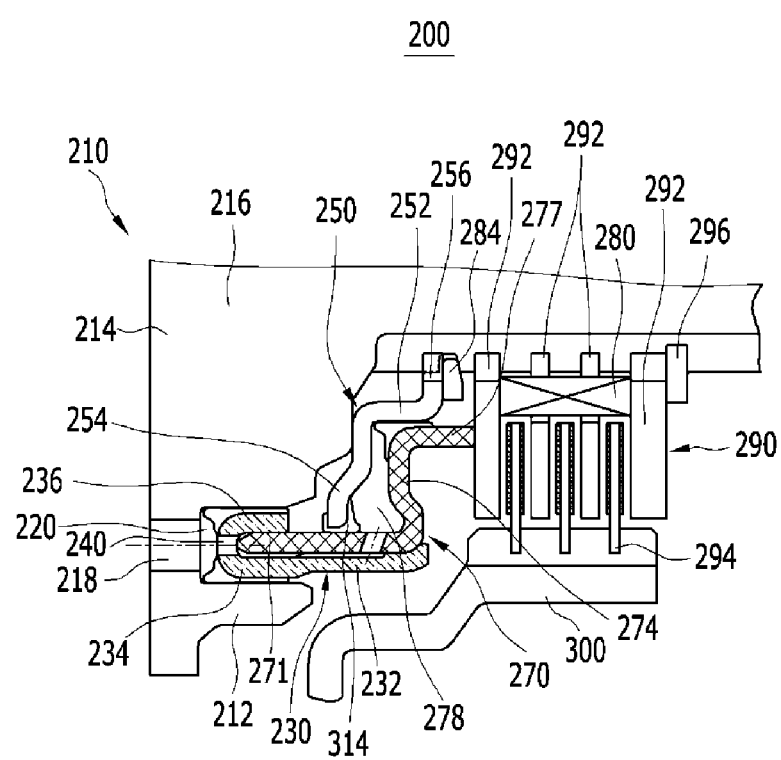

FIG. 20 is a cross-sectional view illustrating a power transmission device in accordance with a seventeenth exemplary embodiment of the present invention. The power transmission device in accordance with the seventeenth exemplary embodiment of the present invention has a different arrangement in the return spring 280 as compared with the fifteenth exemplary embodiment of the present invention.

In accordance with the seventeenth exemplary embodiment of the present invention, the return spring 280 is disposed between the separate plates 292 located at the leftmost side of the drawing and the separate plate 292 located at the rightmost side of the drawing. For this purpose, a hole through which the return spring 280 passes may be formed at a portion of the outer diametric portion of the middle separate plate 292, or the outer diametric portion of the middle separate plate 292 may be formed as a finger.

As described above, in accordance with the exemplary embodiments of the present invention, it is possible to improve power transmission performance, increase efficiency, and enhance durability of a power transmission device by providing a method of determining an appropriate range of a return spring force in a power transmission device including two or more pistons.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmission device comprising:
a housing configured to form a mounting space;
a power transmission hub configured to be selectively and operatively connected to the housing;
two or more pistons, each of which is configured to include a piston chamber, and operatively and selectively connecting the housing to the power transmission hub by an operating hydraulic pressure supplied to the piston chamber; and
at least one return spring configured to provide a return spring force against an axial force caused by the operating hydraulic pressure,
wherein a minimum value $F_{s-min}$ (Kgf) of the resultant force of the return spring force required to disconnect the housing from the power transmission hub is determined by the following formula:

$$F_{s-min} = 0.45 \text{ bar} \times A$$

where "A" (cm$^2$) indicates a total piston area of the two or more pistons, and 1 bar is 1.019716 kgf/cm$^2$.

2. The power transmission device of claim 1, wherein a maximum value $F_{s-max}$ (Kgf) of the resultant force of the return spring force of the at least one return spring is determined by the following formula:

$$F_{s-max} A \times P - 1.2 \times (A^c \times P - 1 \text{ bar} \times A^c)$$

where "P" (Kgf/cm$^2$) indicates the operating hydraulic pressure, and "A$^c$" (cm$^2$) indicates a pressure chamber area formed by the housing.

3. The power transmission device of claim 1, wherein the resultant force of the return spring force of the at least one return spring is determined within a range that is calculated by the following formula:

$$0.45 \text{ bar} \leq \frac{F}{A} \leq P - 1.2 \frac{A^c}{A} \times (P - 1 \text{ bar}).$$

4. The power transmission device of claim 1, wherein the two or more pistons are configured to be movable together in an axial direction by the operating hydraulic pressure supplied to the piston chamber and the return spring force.

5. The power transmission device of claim 1, wherein the at least one return spring is configured to directly apply an elastic force in an opposite direction to that of an axial force caused by the operating hydraulic pressure supplied to one of the two or more pistons.

6. The power transmission device of claim 1, further comprising a clutch pack provided with at least one separate plate connected to the housing and at least one friction disk alternately disposed with said at least one separate plate, wherein said at least one return spring is disposed between adjacent separate plates.

7. The power transmission device of claim 1, further comprising a clutch pack provided with at least one separate plate connected to the housing and at least one friction disk alternately disposed with said at least one separate plate, wherein said at least one return spring is disposed between a separate plate at the end of one side and a separate plate at the end of the other side.

8. The power transmission device of claim 1, further comprising at least one balance wall configured to form at least one balance chamber to provide a balance fluid against a centrifugal hydraulic pressure that acts on the piston chambers.

9. The power transmission device of claim 8, wherein the at least one return spring is disposed in the at least one balance chamber.

10. The power transmission device of claim 8, wherein the at least one balance chamber fluidly communicates with another balance chamber.

11. The power transmission device of claim 1, wherein the operating hydraulic pressure is applied to the two or more piston chambers.

12. The power transmission device of claim 11, wherein the operating hydraulic pressure supplied to any one of the two or more piston chambers is supplied to other piston chamber(s) through operating fluid paths.

13. A power transmission device comprising:
a housing configured to form a mounting space;
a power transmission hub configured to be selectively and operatively connected to the housing;
two or more pistons, each of which is configured to include a piston chamber, and operatively and selectively connecting the housing to the power transmission hub by an operating hydraulic pressure supplied to the piston chamber; and
at least one return spring configured to provide a return spring force against an axial force caused by the operating hydraulic pressure,
wherein a resultant force F (Kgf) of the return spring force is set to a value within a following range so as to control the engagement and disengagement of the housing and the power transmission under a feedback control method or an adaptive control method:

$$0.5 \leq \frac{F}{A} \leq 1.8$$

where "A" (cm$^2$) indicates a total piston area of the two or more pistons.

14. The power transmission device of claim 13, wherein the two or more pistons are configured to be movable together in an axial direction by the operating hydraulic pressure supplied to the piston chamber and the return spring force.

15. The power transmission device of claim 13, wherein the at least one return spring is configured to directly apply an elastic force to any one of the two or more pistons in an opposite direction of an axial force caused by the operating hydraulic pressure.

16. The power transmission device of claim 13, further comprising a clutch pack provided with at least one separate plate connected to the housing and at least one friction disk alternately disposed with said at least one separate plate, wherein said at least one return spring is disposed between adjacent separate plates.

17. The power transmission device of claim 13, further comprising a clutch pack provided with at least one separate plate connected to the housing and at least one friction disk alternately disposed with said at least one separate plate,
wherein said at least one return spring is disposed between a separate plate at the end of one side and a separate plate at the end of the other side.

18. The power transmission device of claim 13, further comprising
at least one balance wall configured to form at least one balance chamber to provide a balance fluid against a centrifugal hydraulic pressure that acts on the piston chambers.

19. The power transmission device of claim 18, wherein the at least one return spring is disposed in the at least one balance chamber.

20. The power transmission device of claim 18, wherein the at least one balance chamber fluidly communicates with another balance chamber.

21. The power transmission device of claim 13, wherein the operating hydraulic pressure is applied to the two or more piston chambers.

22. The power transmission device of claim 21, wherein the operating hydraulic pressure supplied to any one of the two or more piston chambers is supplied to other piston chamber(s) through operating fluid paths.

* * * * *

UNITED STATES PATENT AND TRADEMARK OFFICE
CERTIFICATE OF CORRECTION

PATENT NO. : 9,458,896 B2  
APPLICATION NO. : 14/450460  
DATED : October 4, 2016  
INVENTOR(S) : Dong-Hoon Park Page 1 of 2

It is certified that error appears in the above-identified patent and that said Letters Patent is hereby corrected as shown below:

On the Title Page

Item [57], Lines 9 and 11, change "power transmission plate" to --power transmission hub--.

In the Specification

Column 2, Line 22, change "Kgf" to --kgf--;
Column 2, Line 28, change "1.033" to --1.019716--;
Column 2, Line 29, change "Kgf" to --kgf--;
Column 2, Line 33, change "AλP" to --A×P--;
Column 2, Line 35, change "Kgf/cm$^2$" to --kgf/cm$^2$--;
Column 2, Line 37, change "(Kgf)" to --(kgf)--;
Column 2, Line 46, change "F" to --F(kgf)--;
Column 3, Line 13, change "(Kgf)" to --(kgf)--;
Column 3, Line 18, change "1.033" to --1.019716--;
Column 3, Line 19, change "Fs-max" to --Fs-max (kgf)--;
Column 3, Line 24, change "1.033" to --1.019716--;
Column 3, Line 25, change "(Kgf)" to --(kgf)--;
Column 3, Line 34, change "(Kgf)" to --(kgf)--;
Column 9, Line 24, change "(Kgf)" to --(kgf)--;
Column 9, Line 27, change "Kgf/cm$^2$" to --kgf/cm$^2$--;
Column 9, Line 28, change "(Kgf)" to --(kgf)--;
Column 10, Line 1, change "1.033 Kgf/cm$^2$)" to --1.019716 kgf/cm$^2$--;
Column 10, Line 13, change "(Kgf)" to --(kgf)--;
Column 10, Line 25, change "(Kgf/mm)" to --(kgf/mm)--;
Column 10, Line 40, change "(Kgf)" to --(kgf)--;
Column 10, Line 54, change "(Kgf)" to --(kgf)--;
Column 10, Line 61, change "(Kgf)" to --(kgf)--;
Column 11, Line 16, change "(Kgf)" to --(kgf)--;

Signed and Sealed this  
Twenty-eighth Day of August, 2018

Andrei Iancu  
*Director of the United States Patent and Trademark Office*

CERTIFICATE OF CORRECTION (continued)
U.S. Pat. No. 9,458,896 B2

Column 11, Line 17, change "hydraulic pressure acting on the area" to --hydraulic pressure P (kgf/cm²) acting on the area--;
Column 11, Line 25, change "$f_s^c$" to --$F_s^c$--;
Column 11, Line 37, change "(Kgf)" to --(kgf)--;
Column 11, Line 52, change "(Kgf)" to --(kgf)--;
Column 12, Line 1, change "(Kgf)" to --(kgf)--;
Column 19, Line 57, change "52" to --54--;
Column 22, Line 11, change "in the piston 230" to --in the first piston 230--;
Column 25, Line 4, change "236" to --232--;
Column 25, Line 67, change "in the piston 230" to --in the first piston 230--;

In the Claims

Column 29, Line 28, Claim 1 change "(Kgf)" to --(kgf)--;
Column 29, Line 38, Claim 2 change "(Kgf)" to --(kgf)--;
Column 29, Line 42, Claim 2 change "Fs-max A × P - 1.2 × (A$^c$ × P -1 bar × A$^c$)" to --Fs-max = A × P - 1.2 × (A$^c$ × P -1 bar × A$^c$)--;
Column 29, Line 43, Claim 2 change "(Kgf/cm²)" to --(kgf/cm²)--;
Column 29, Line 47, Claim 3 change "resultant force of the return spring force" to --resultant force F (kgf) of the return spring force--;
Column 30, Line 42, Claim 13 change "F (Kgf)" to --F (kgf)--.